(12) United States Patent
Hovey

(10) Patent No.: US 11,746,548 B2
(45) Date of Patent: Sep. 5, 2023

(54) ROTARY VALVES FOR WAVE GENERATOR CAISSONS

(71) Applicant: Surf Loch LLC, San Diego, CA (US)

(72) Inventor: Steve Hovey, San Diego, CA (US)

(*) Notice: Subject to any disclaimer, the term of this patent is extended or adjusted under 35 U.S.C. 154(b) by 179 days.

(21) Appl. No.: 17/022,682

(22) Filed: Sep. 16, 2020

(65) Prior Publication Data

US 2021/0156162 A1 May 27, 2021

Related U.S. Application Data

(60) Provisional application No. 62/901,372, filed on Sep. 17, 2019.

(51) Int. Cl.
*E04H 4/00* (2006.01)
*F16K 11/085* (2006.01)

(52) U.S. Cl.
CPC ........ *E04H 4/0006* (2013.01); *F16K 11/0853* (2013.01)

(58) Field of Classification Search
CPC .............. E04H 4/0006; F16K 11/0853; F16K 11/085; F16K 11/0856; F04D 35/00
See application file for complete search history.

(56) References Cited

U.S. PATENT DOCUMENTS

| | | | |
|---|---|---|---|
| 4,506,697 A * | 3/1985 | Marchant | F16K 11/0856 137/240 |
| 4,730,355 A | 3/1988 | Kreinbihl et al. | |
| 4,841,595 A * | 6/1989 | Wiese | A47L 7/0028 15/352 |
| 5,285,536 A * | 2/1994 | Long | E04H 4/0006 4/491 |
| 5,988,219 A | 11/1999 | Larsen | |
| 2015/0136259 A1 | 5/2015 | Lallemant et al. | |

FOREIGN PATENT DOCUMENTS

KR 1020120117538 10/2012
WO WO0008363 A2 2/2000

* cited by examiner

*Primary Examiner* — Michael R Reid
(74) *Attorney, Agent, or Firm* — J. John Shimazaki

(57) ABSTRACT

The invention comprises an adjustable valve system, apparatus and method using an adjustable drum assembly that can be used in conjunction with a blower or pump to drive air into and out of the drum assembly, wherein the adjustable valve system is useful in connection with operating wave generator caissons for wave pools. The present system preferably comprises an inner drum coaxially aligned and rotatably positioned within an outer drum, wherein side openings are provided on the inner and outer drums which can be aligned together to allow air to flow into and/or out of the drum assembly. That way, by adjusting the position of the inner drum relative to the outer drum, the valve system can enable the air to flow either into or out of the drum assembly and therefore the associated caisson. The system can be used to introduce positive or negative air pressure in the caisson and create waves in a wave pool.

19 Claims, 7 Drawing Sheets

ROTARY VALVES FOR WAVE GENERATOR CAISSONS

RELATED APPLICATION

This application claims the benefit of the filing date of U.S. Provisional Application Ser. No. 62/901,372, filed on Sep. 17, 2019.

FIELD OF THE INVENTION

The invention relates to valve systems for wave generators and in particular to rotary valves that can be adjusted and controlled so that a blower or pump can be used to cause air to flow into or out of a wave generator caisson, depending on the setting of the valve, and thereby increase or decrease pressure therein.

BACKGROUND OF THE INVENTION

Wave pools are common attractions at water theme parks. Most wave pools have wave generators provided at one end of the pool to create waves that travel across the pool and break along the opposite beach end. Wave generators can come in various types and configurations. For example, a plurality of wave generators can be provided along one end positioned adjacent to each other, wherein by operating the wave generators sequentially, one after the other, each wave created by each wave generator will merge together sequentially to create a single resultant wave. In such case, one common arrangement used commercially involves the use of a series of caissons extended along the deep-end of a wave pool, wherein each caisson communicates with the pool through a slot opening near the pool bottom. Air under pressure is introduced into the caisson, such as from above, to push the water column in the caisson down so that water is forced downward and forward through the lower slot opening to create wave motions in the pool. Air under pressure is typically driven into the caisson, through an opening or valve located at or near the top of the caisson, by a pump or blower to increase the air pressure in the caisson. The valve can also control the rate of air flow into the caisson.

Typically, after the column of water travels down from each caisson through its slot opening into the pool, each caisson can be refilled with water by allowing air to be released out of the caisson, such as through another opening located at the top of the caisson. In other words, when the water column in the caisson falls below the static equilibrium water level in the pool, the restoring force of gravity can cause the water from the pool to be drawn back into the caisson, through the lower slot opening, until it is restored back to its equilibrium position relative to the static water level of the pool, wherein a vent valve can be used to control the flow of air out of the caisson. A vacuum pump can also be used to suck air out of the caisson to create reduced pressure relative to the atmosphere in the caisson, which causes the column of water in the caisson to be drawn upward, and if desired, above the equilibrium water level to start the cycle over again. As each caisson is operated in this manner, individual waves can be created by each caisson which eventually merge together to form a single resultant wave.

A typical wave generator of this type will have two blowers or pumps—one blower or pressure pump to drive air into the caisson, and a second vacuum pump or blower to drive air out of the caisson. It may also have an air valve to control the inflow of air into the caisson, and a vent valve to control the outflow of air out of the caisson. In this respect, existing systems often require two pumps or two blowers or a combination of each, and a series of two to four independently controlled valves and openings to simultaneously control the flow of air into and out of the caisson. A controller can control the actuation of each wave generator, including the pumps, blowers and valves, etc. Extensive ductwork is required to connect these pumps, blowers, valves and openings, etc.

Because of these requirements, existing systems can be complex and costly to install, and can involve extensive ductwork, as well as the need for two or more pumps or blowers to work properly. A multiplicity of blowers, pumps and valves can also introduce greater flow friction, and potentially, result in more energy loss.

What is needed, therefore, is a mechanism and system that is easy to use and cost effective and that will overcome the disadvantages identified above.

SUMMARY OF THE INVENTION

While existing systems typically use a series of two to four independently controlled butterfly valves to simultaneously control flow direction and air throttling, the subject rotary valve uses a single axis of control that handles both throttle and direction. This functional grouping of flow and directional control reduces cost, complexity and potentially friction, and overcomes the disadvantages of existing systems, wherein each axis of control represents more hardware, more software, more electronics, and more frictional turbulence, and therefore, more associated energy loss. Traditional systems also require more ductwork to accommodate greater valve count, which makes them larger in terms of height and footprint, and subjects the flow of air to significantly greater friction and angular change and energy loss, and thus, they require more power to equal the same output.

On the other hand, the present rotary valve mechanism and system minimizes the amount of space needed to accommodate the equipment, and far fewer moving parts are needed, thereby reducing maintenance, and the likelihood of failure, wherein the present valve involves only one axis of control and requires less ductwork, less hardware, less software, less electronics, less friction, less turbulence, and therefore, less associated energy loss.

The present rotary valve comprises several embodiments, including:

1) a four-way rotary valve with one blower or pump,
2) a three-way rotary valve with two blowers or two pumps or one of each,
3) a three-way rotary valve with one blower or pump, and
4) a three-way rotary valve of the kind mentioned in items 2 and 3 above with one or more plenums.

Each of these embodiments will now be summarized:

1. Four-Way Rotary Valve with One Blower or Pump:

The four-way rotary valve is preferably operated in conjunction with a single blower or pump that can be used to control the movement of a fluid through a duct—in this case the fluid is air—between a first area and a second area, wherein, in this case, the first area is a caisson and the second area is the atmosphere.

The four-way valve preferably comprises a drum assembly having an upper port that communicates with the atmosphere, and a lower port that communicates with an opening at or near the top of the caisson, wherein the valve is preferably situated on top of or adjacent the caisson on or near the top thereof.

The drum assembly preferably comprises an inner drum adapted to rotate inside an outer drum, wherein the inner and outer drums are coaxially aligned and extended about a single axis of rotation, wherein the inner drum is preferably constructed with a first vertically extended cylindrical side wall which has two side ports located thereon, and the outer drum is preferably constructed with a second vertically extended cylindrical side wall which has an inflow port and an outflow port located thereon.

The side ports on the inner drum are preferably substantially the same size and shape as the inflow and outflow ports on the outer drum, wherein the side ports and inflow and outflow ports are preferably positioned at substantially the same height, such that the side ports can be aligned together with the inflow and outflow ports, to enable air to pass into and out of the drum assembly. Preferably, the side ports on the inner drum and the inflow and outflow ports on the outer drum are situated on opposite sides of the drums, wherein they are preferably at about 180 degrees relative to each other, although not necessarily so.

A baffle is preferably provided within an inner compartment of the drum assembly, to split the inner compartment into two smaller compartments—an upper compartment and a lower compartment. The baffle preferably extends at about a 45 degree angle relative to the drum assembly, although it can be extended at any angle that produces the desired results.

Preferably, a duct is connected to the drum assembly and extended around in the form of a loop, with the duct connected to opposite ends of the drum assembly, thus allowing air to flow into and out of the drum assembly as it is circulated through the duct. The blower or pump is preferably associated with the duct in a manner that allows the operation of the blower or pump to drive the air within the duct in a single direction. That way, when the side ports are aligned with the inflow and outflow ports, the air can flow around the duct and enter into and out of the drum assembly, through the inflow and outflow ports, wherein the drum assembly communicates with the inflow and outflow ports and the duct.

Preferably, by rotating the inner drum relative to the outer drum, the valve can be operated in at least three positions, including:

A first vacuum position: This consists of the side ports on the inner drum being aligned with the inflow and outflow ports on the outer drum, with the baffle extended in a first position, which creates 1) a first upper compartment in the drum assembly comprising an inflow port communicating from the duct into the drum assembly, and an upper port communicating out of the drum assembly into the atmosphere, and 2) a first lower compartment comprising a lower port communicating out of the caisson into the drum assembly, and an outflow port communicating out of the drum assembly into the duct. In this position, as the blower or pump is operated, the air travelling in a single direction is preferably drawn out of the caisson through the lower port, and into the drum assembly, wherein the air will flow out through the outflow port and into the duct, and then, as the air is driven by the blower or pump, it will flow around the duct and back into the drum assembly through the inflow port, wherein the baffle directs the air out of the drum assembly up through the upper port and into the atmosphere.

In this first position, the baffle is preferably positioned such that the air will be drawn upward out of the caisson and into the first lower compartment, and then, after it flows around the duct, it will be introduced into the first upper compartment, wherein the baffle causes the air to flow up through the upper port into the atmosphere, thereby decreasing pressure inside the caisson, and causing water in the wave pool can be drawn back into the caisson.

A second pressure position: This also consists of the side ports on the inner drum being aligned with the inflow and outflow ports on the outer drum, but with the baffle extended in a second position, which creates 1) a second upper compartment comprising an upper port communicating into the drum assembly from the atmosphere, and an outflow port communicating out of the drum assembly into the duct, and 2) a second lower compartment comprising an inflow port communicating out of the duct and into the drum assembly, and a lower port communicating out of the drum assembly into the caisson. In this position, as the blower or pump is operated, the air travelling in a single direction is preferably drawn out of the atmosphere, through the upper port, and into the drum assembly, wherein the air will flow out through the outflow port and into the duct, and then, as the air is driven by the blower or pump, it will circulate around the duct and flow back into the drum assembly, through the inflow port, wherein the baffle directs the air out of the drum assembly down through the lower port and into the caisson.

In this second position, the baffle is preferably positioned such that the air will be drawn down from the atmosphere and into the second upper compartment, and then, after it flows around the duct, it will be introduced into the second lower compartment of the drum assembly, wherein the baffle causes the air to flow down through the lower port into the caisson, thereby increasing pressure inside the caisson, and driving water in the caisson down and forward into the wave pool to create a wave.

A third shut-off position: This preferably consists of the inner drum being rotated so that the inflow and outflow ports on the outer drum are blocked by the cylindrical side wall of the inner drum, which shuts off the inflow and outflow ports, and thus, prevents the air from entering into and exiting from the drum assembly. In this position, the inner drum is preferably positioned such that the drum assembly will be shut off from the duct, by virtue of closing the inflow and outflow ports, although the upper and lower sections may be open to the upper and lower ports, respectively.

The rotational position of the inner drum relative to the outer drum can also be adjusted and varied, which can cause the size of the openings on the inflow and outflow ports to be adjusted and varied, such that the amount and rate at which air flows into and out of the drum assembly can also be adjusted and varied. Ports of varying sizes can also be used.

Thus, operating the blower or pump using the controllable drum assembly to rotate the inner drum enables the direction and throttling of the air within the valve to be controlled and adjusted, wherein by setting the valve in one position, air can be introduced into the caisson to increase air pressure to create a wave, and likewise, in another position, air can be withdrawn from the caisson to decrease air pressure and cause water to flow back into the caisson, and in other positions, air into and out of the drum assembly can be adjusted and varied, wherein pressure within the caisson can also be adjusted and varied, thereby enabling various wave formations to be created.

These steps can be repeated multiple times to create multiple waves intermittently and independently.

2. Three-Way Rotary Valve with Two Blowers or Pumps:

This embodiment of the three-way rotary valve is preferably operated with two blowers or two pumps or one of each for controlling the movement of air between a first area and a second area, in this case, the first area is an associated caisson and the second area is the atmosphere.

A drum assembly preferably comprises an inner drum and an outer drum, wherein the inner drum is adapted to rotate inside the outer drum. Preferably, the inner drum comprises a cylindrical side wall that has one side port thereon, and the outer drum comprises a cylindrical side wall that has an inflow port and an outflow port thereon, wherein the cylindrical side walls are coaxially aligned relative to each other and rotate about a single axis.

Preferably, the inflow and outflow ports on the outer drum are located at least 90 degrees, and preferably about 120 degrees, apart from each other on the outer drum. They are also sized, shaped and located such that, depending on the rotation of the inner drum, either the inflow port or outflow port is aligned with the side port on the inner drum, wherein the alignment of the ports will allow air to flow into or out of the drum assembly through the side port.

Preferably, the drum assembly is positioned on and connected to the top of the caisson and has a closed top to seal the drum assembly and an open bottom with a lower port that communicates with an opening on or near the top of the caisson. That way, air can flow into or out of the caisson through the bottom of the drum assembly.

Rotating the inner drum relative to the outer drum enables the valve to be operated in at least two positions:

The first position consists of the side port on the inner drum being aligned with the inflow port on the outer drum, with the first blower or pump connected to or otherwise communicating with the inflow port. This enables the first blower or pump to draw air out of the atmosphere through an open port, and into the drum assembly through the inflow port, and down into the associated caisson through the lower port, thereby increasing pressure in the caisson, wherein water in the caisson can be forced downward and forward through a lower opening to create a wave in the associated wave pool.

The second position consists of the side port on the inner drum being aligned with the outflow port on the outer drum, with the second blower or pump connected to or otherwise communicating with the outflow port. This enables the second blower or pump to draw air out of the caisson through the lower port, and into the drum assembly, and out through the outflow port, and into the atmosphere through an open port, thereby decreasing pressure in the caisson, wherein water in the wave pool will be drawn back into the caisson until it reaches a predetermined level, such as above the wave pool's static equilibrium.

The rotational position of the inner drum relative to the outer drum can also be adjusted and varied, which can cause the size of the openings on the inflow and outflow ports to be adjusted and varied, such that the amount and rate at which air flows into and out of the drum assembly can also be adjusted and varied. The size of the ports can also be varied.

Thus, operating the blower or pump using the controllable drum assembly to rotate the inner drum enables the direction and throttling of the air within the valve to be controlled and adjusted, wherein by setting the valve in one position, air can be introduced into the caisson to increase air pressure to create a wave, and likewise, in another position, air can be withdrawn from the caisson to decrease air pressure and cause water to flow back into the caisson, and in other positions, air into and out of the drum assembly can be adjusted and varied, wherein pressure within the caisson can also be adjusted and varied, thereby enabling various wave formations to be created.

These steps can be repeated multiple times to create multiple waves.

3. Three-Way Rotary Valve with One Blower or Pump:

When only one blower or pump is used with the three-way rotary valve, it can be connected to and/or associated with either the inflow port, or the outflow port.

First, when the blower or pump is associated with the inflow port, the inner drum is preferably rotated such that the side port on the inner drum is aligned with the inflow port on the outer drum, so that the blower or pump can be used to drive air from the atmosphere through the inflow port and into the drum assembly, and then, into the caisson through the lower port, which increases air pressure in the caisson and causes the water level in the caisson to drop. This also causes water in the caisson to be pushed down and forward into the wave pool to create a wave.

Then, after the water level in the caisson has dropped below the wave pool's water level equilibrium, the inner drum can be rotated again, so that this time its side port is aligned with the outflow port, which is open and vented to the atmosphere. According, air in the caisson will be allowed to be released into the atmosphere, through the outflow port, thus reducing air pressure in the caisson and allowing water to flow back into the caisson from the wave pool due to the restoring force of gravity. Note, in this embodiment, the outflow port is open to atmosphere since there's no blower or pump associated with the outflow port, thus enabling air to be released. Thus, the pressure differential that will exist between the water in the wave pool and water in the caisson, along with the restoring force of gravity, can cause the water in the wave pool to flow back into the caisson, thus helping to refill the caisson with water, so that it will be ready for the next wave cycle.

Note, at any time, such as after a sufficient amount of water has been allowed to flow back into the caisson, the inner drum can be rotated again, so that its side port is blocked by the cylindrical side wall of the outer drum, thereby preventing the flow of air into and out of the drum assembly, and thus, stopping the flow of water into the caisson. That way, the water level in the caisson can be controlled and stabilized, to ensure that it will be ready for the next wave, after the previous wave cycle has been completed.

Second, when the blower or pump is associated with the outflow port, the inner drum can be rotated with the side port on the inner drum aligned with the outflow port on the outer drum, so that the blower or pump can drive air out of the caisson through the lower port, and into the drum assembly, and then, into the atmosphere, through the outflow port, which reduces the air pressure within the caisson and draws water from the wave pool into the caisson, thereby causing the water level in the caisson to rise.

Then, after the water has been allowed to fill the caisson to a predetermined level, and the water level in the caisson is substantially above the wave pool's static water level equilibrium, the inner drum can be rotated again, so that its side port is aligned with the inflow port, which is open to atmosphere, thereby allowing air to flow back into the drum assembly through the inflow port, and into the caisson, through the lower port. Thus, by virtue of the restoring force of gravity, and as water seeks its own level, water in the caisson will drop down and flow forward into the wave pool to create the next wave. Because water in the caisson will be above the static equilibrium, simply opening the inflow port will cause air to enter into the caisson, and thus, the pressure differential between the caisson and the wave pool will cause the water level in the caisson to drop, thereby forcing water into the wave pool to create the next wave.

Note that during each of these wave cycles, after a sufficient amount of water has been allowed to flow back into or out of the caisson, the inner drum can be rotated again, so that its side port is blocked by the cylindrical side wall of the outer drum, thereby preventing the flow of air into and out of the drum assembly, and thus, stopping the flow of water into or out of the caisson. That way, the water level in the caisson can be controlled and stabilized, such that the system can be made ready for the next wave, after the previous wave cycle has been completed.

The rotational position of the inner drum relative to the outer drum can also be adjusted and varied, which can cause the size of the inflow and outflow ports to be adjusted and varied, such that the amount and rate at which air flows into and out of the drum assembly can also be adjusted and varied.

Thus, operating the blower or pump using the controllable drum assembly to rotate the inner drum enables the direction and throttling of the air within the valve to be controlled and adjusted, wherein by positioning the blower or pump in association with the inflow port or outflow port, and setting the valve in one position or another, air can be withdrawn to decrease air pressure or allowed to be released from the caisson, wherein this can cause water to flow back into the caisson, or air can be driven into the caisson to increase pressure or allowed to flow back into the caisson, wherein this can cause the water in the caisson to be driven or drop down, and forward into the wave pool, thereby helping to create the next wave, and in other positions, air into and out of the drum assembly can be adjusted and varied, wherein pressure within the caisson can be adjusted and varied, thereby enabling various wave formations to be created.

Using the controllable drum assembly to rotate the inner drum enables the movement of the air to be controlled from one wave cycle to the next. And by setting the inner drum in different positions, the blower or pump can either introduce air into the caisson to increase air pressure and create a wave, or it can withdraw air from the caisson to decrease air pressure and cause the water to flow back into the caisson. These steps can be repeated multiple times to create multiple waves.

4. Three-Way Rotary Valve with One or More Plenums:

In several alternate embodiments, one or more plenums can be used to store air pressure in connection with the use of each of the above described three-way rotary valves, wherein positive air pressure can be stored in the plenum when it is positioned to introduce air into the caisson, and negative air pressure can be stored in the plenum when it is positioned to withdraw air from the caisson. This can be accomplished in a similar manner, whether two plenums are used with two blowers or pumps, or only one plenum is used with one blower or pump.

Multiple blowers or pumps can also be used in connection with each plenum. Nevertheless, for ease of understanding, the description herein will refer to only one blower or pump being used with each plenum, although it should be understood that multiple blowers or pumps, such as a bank of blowers, can be used in connection with each plenum, whether the plenum stores positive or negative air pressure therein.

First, when two blowers or pumps are used, a first plenum is preferably provided between the first blower or pump and the drum assembly, and in such case, the first plenum stores positive air pressure as the first blower or pump drives air from the atmosphere and into the first plenum, wherein a valve is preferably provided to release the air stored in the first plenum, such that, at the appropriate time, air can flow into the drum assembly through the inflow port, and into the caisson through the lower port, to create increased air pressure in the caisson and thus create a wave in the wave pool.

Likewise, a second plenum can be provided between the second blower or pump and the drum assembly, and in such case, the second plenum preferably stores negative air pressure as the second blower or pump drives air out of the second plenum, wherein a second valve can be provided that will allow the negative air pressure stored in the second plenum to draw air out of the caisson through the lower port, wherein the air in the second plenum can then be vented and released into the atmosphere through the outflow port, using the second blower or pump.

In either case, the plenums can be used to smooth out the energy demand, and enable lower capacity blowers and pumps to be used to achieve similar results.

Second, when the three-way rotary valve has one blower or pump, a plenum can be provided between the one blower or pump and the drum assembly, wherein when the plenum is used in association with the inflow port, it can store positive air pressure therein before it is released into the caisson, and when the plenum is used in association with the outflow port, it can store negative air pressure therein before allowing the negative pressure to draw air out of the caisson, wherein the blower or pump can be used to draw air out of the plenum and into the atmosphere.

Each plenum preferably comprises a valve that controls the flow of air into and out of the drum assembly—to enable air to be compressed when positive air pressure is required, and to enable air to be withdrawn from the plenum when negative air pressure is required. Likewise, the valve can be used to release the compressed air when positive air pressure is stored and needed, and the valve can be used to draw air into the plenum when negative air pressure is stored.

DETAILED DESCRIPTION OF THE INVENTION

The following are descriptions of the four-way rotary valve shown in FIGS. 1-8 and the three-way rotary valve shown in FIGS. 9-16.

A. Four-Way Rotary Valve:

The four-way rotary valve 1 is designed to be used with a single blower 3, one wave generator caisson 5 (shown beneath the valve in FIGS. 3 and 6), wherein the valve can be located on top of or adjacent to caisson 5, and no plenums.

Figure 1:
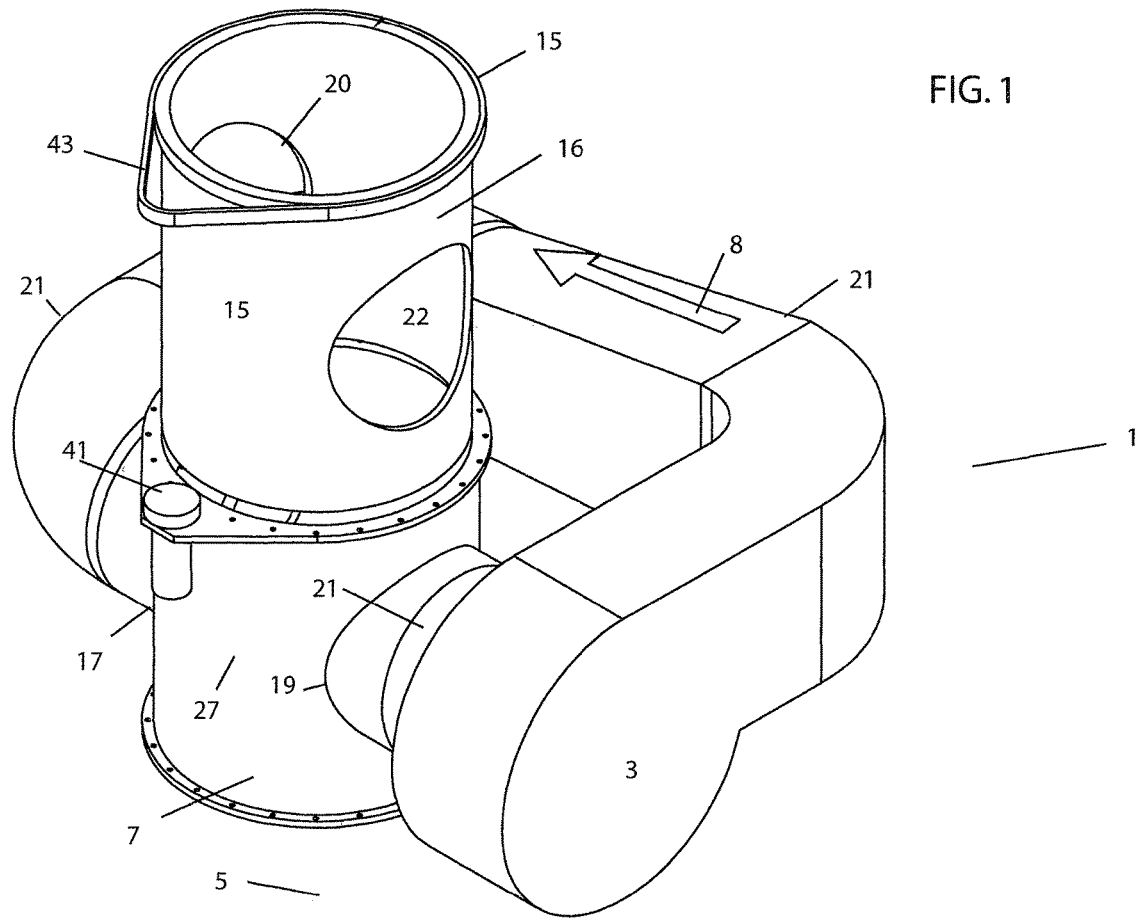
FIG. 1 is a perspective/exploded view of the four-way rotary valve showing the drum assembly, the blower and duct extending around the valve, but with the inner drum separately shown elevated axially above the outer drum (the inner drum is normally positioned inside the outer drum in its operational configuration, as shown in FIGS. 4 and 7)

As shown in FIG. 1, four-way rotary valve 1 preferably comprises a drum assembly 7 situated within a duct 21 that forms a loop, wherein a single blower or pump 3 is used to drive air through the duct in a single direction, into and out of drum assembly 7, wherein the position of the valve determines whether the air is driven into or out of caisson 5. Note that when the term blower or pump is used throughout, it can refer to any device that can cause air to flow through the valve.

Figure 3:
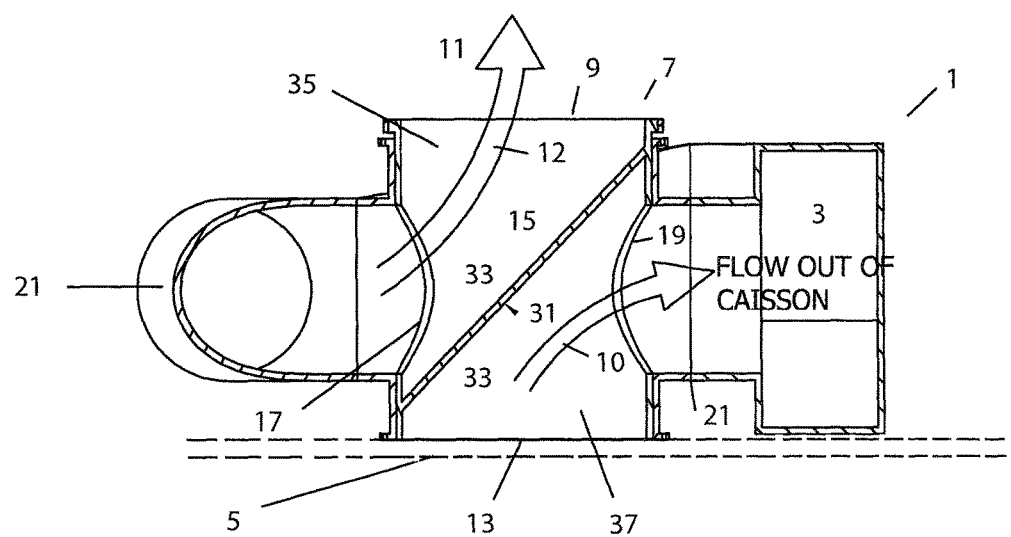
FIG. 3 is a section view of the four-way rotary valve taken along Section A-A of FIG. 5, showing the drum assembly, duct and blower, with the inner drum in the vacuum position.
Figure 4:
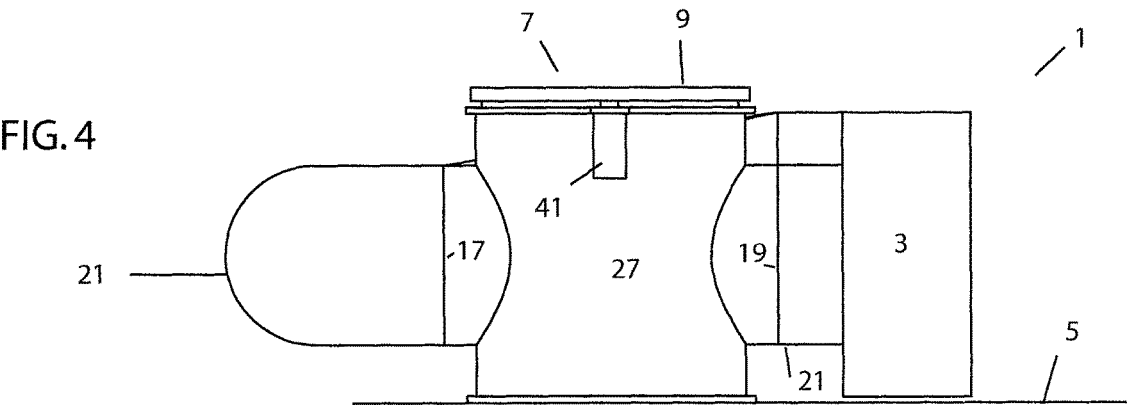
FIG. 4 is a side elevation view of the four-way rotary valve showing the drum assembly, duct and blower.
Figure 6:
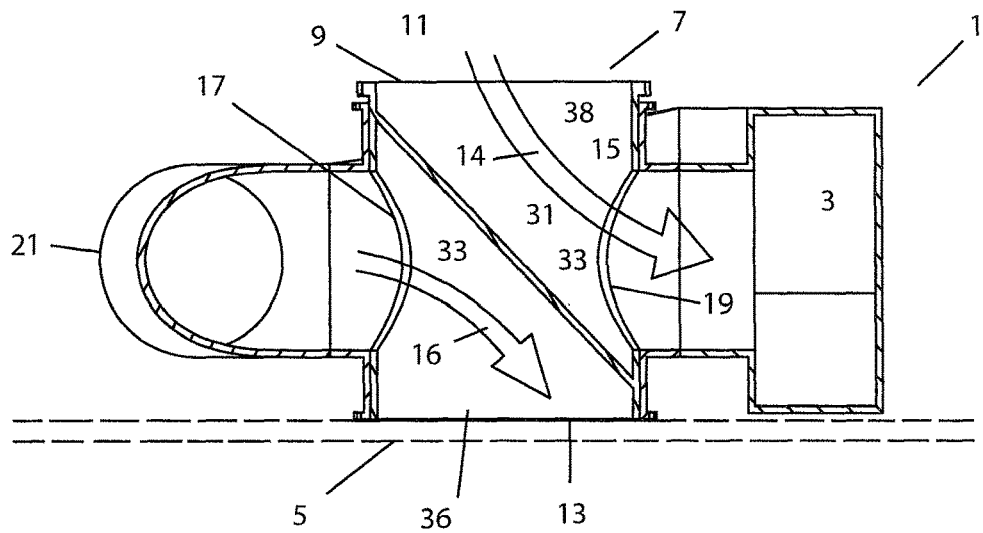
FIG. 6 is a section view of the four-way rotary valve taken along Section B-B of FIG. 8, showing the drum assembly, duct and blower, with the inner drum in the pressure position.
Figure 7:
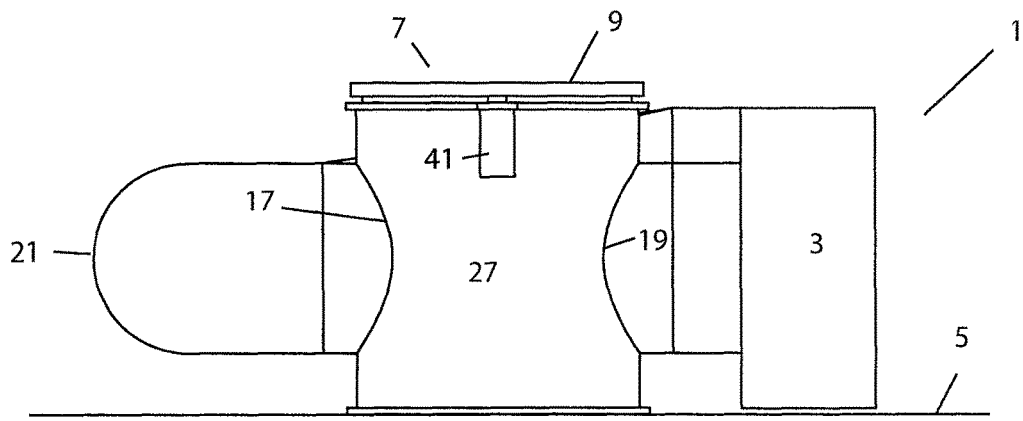
FIG. 7 is a side elevation view of the four-way rotary valve showing the drum assembly, duct and blower.

FIGS. 3 and 6 show this embodiment with drum assembly 7, with an upper port 9 vented to atmosphere 11, and a lower port 13 communicating with associated caisson 5. Preferably, there is an opening at the top of or adjacent caisson 5 which communicates with lower port 13 of drum assembly 7.

Drum assembly 7 preferably has an inner drum 15 rotatably positioned inside outer drum 27. Although FIG. 1 shows inner drum 15 positioned coaxially on top of outer drum 27, in operation, inner drum 15 is preferably coaxially positioned inside outer drum 27, such that inner drum 15 rotates relative to outer drum 27 about a single axis. Both inner drum 15 and outer drum 27 each preferably have a vertically extended cylindrical side wall, 16 and 18, respectively, as shown in FIG. 1, wherein side wall 16 is slightly smaller in diameter than side wall 18, such that inner drum 15 can rotate inside outer drum 27.

Inner drum 15 preferably has two side ports, 20 and 22, that are preferably offset or located 180 degrees apart from each other, and outer drum 27 preferably has an "inflow" port 17 that is preferably offset or located 180 degrees apart from an "outflow" port 19. The inflow and outflow ports, 17 and 19, are preferably provided on outer drum 27, wherein by rotating inner drum 15 inside outer drum 27, the two side ports 20 and 22 of inner drum 15 can be aligned with inflow and outflow ports 17 and 19 of outer drum 27, thus allowing air to pass into and out of drum assembly 7 via inflow and outflow ports 17 and 19.

Preferably, side ports, 20 and 22, on inner drum 15 are the same size and shape as inflow and outflow ports, 17 and 19, on outer drum 27, although not necessarily so, and preferably located at the same height, wherein one side port 20 is located 180 degrees offset from a second side port 22, and wherein inflow port 17 is located 180 degrees offset from outflow port 19, wherein side ports, 20 and 22, on inner drum 15 and inflow and outflow ports 17 and 19, on outer drum 27 can be aligned and allow air to pass through them when needed. Accordingly, by rotating inner drum 15 relative to outer drum 27, and by aligning side ports 20 and 22 with inflow and outflow ports, 17 and 19, on inner and outer drums, 15 and 27, air is allowed to pass into drum assembly 7 through inflow port 17, and pass out of drum assembly 7 through outflow port 19.

Figure 5:
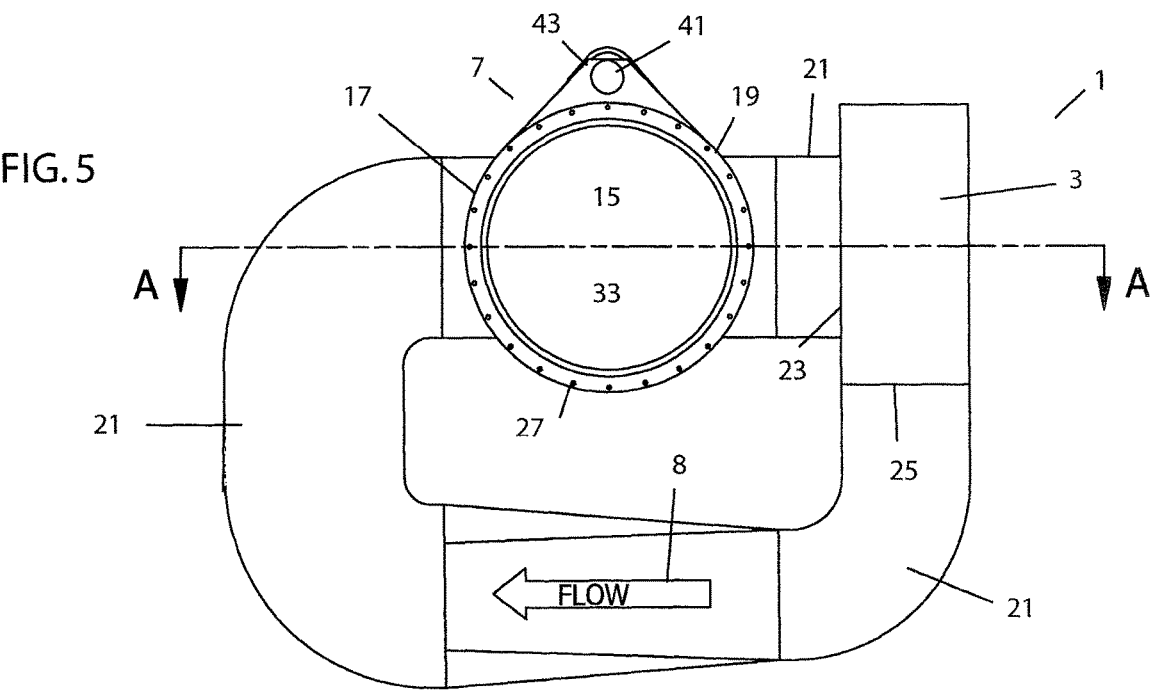
FIG. 5 is a bottom view of the four-way rotary valve showing the drum assembly, duct and blower, along with the orientation of Section A-A.
Figure 8:
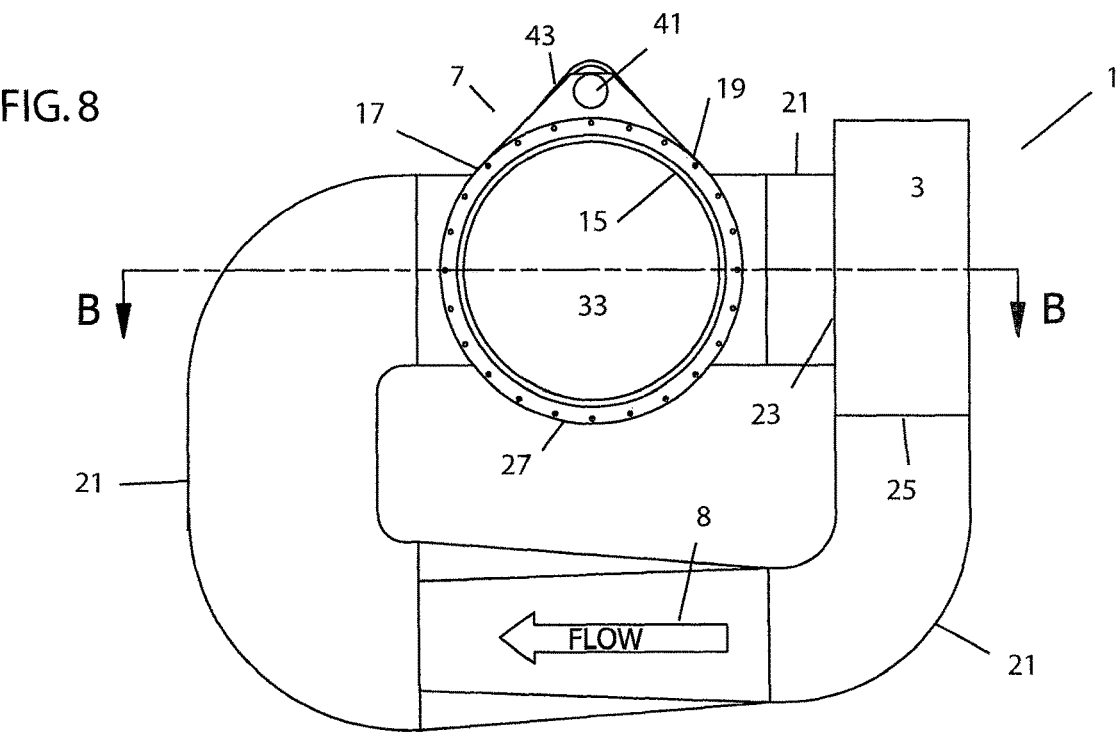
FIG. 8 is a bottom view of the four-way rotary valve showing the drum assembly, duct and blower, along with the orientation of Section B-B.

Inflow and outflow ports 17 and 19 in outer drum 27 are preferably connected to and communicate with duct 21 which preferably extends in the form of a loop, wherein blower or pump 3 is preferably connected to and communicates with duct 21 such that it can drive and circulate air through and around duct 21 in one direction 8, as shown in FIGS. 1, 5 and 8. Accordingly, as shown in FIG. 1, blower or pump 3 can be used to drive air from drum assembly 7, and out through outflow port 19, and into blower or pump 3, and then around duct 21, in direction 8, and back into drum assembly 7, through opposite inflow port 17. Also, as shown in FIGS. 3 and 6, blower or pump 3 can be used to drive air into and out of drum assembly 7, from and to the atmosphere 11, through upper port 9, and to drive air into and out of drum assembly 7, from and to caisson 5, through lower port 13, depending on the valve setting.

Single blower or pump 3 is preferably connected to and communicates with duct 21 to drive air in a single direction (shown by arrow 8) through duct 21. Thus, blower or pump 3 is positioned so that its intake side 23, as shown in FIGS. 5 and 8, communicates with outflow port 19 on drum assembly 7, via duct 21, wherein blower 3 can draw air out of drum assembly 7, and into duct 21, through outflow port 19. Likewise, blower or pump 3 is positioned so that its outlet or exhaust side 25, also shown in FIGS. 5 and 8, communicates with inflow port 17 on drum assembly 7, so that blower or pump 3 can drive air into drum assembly 7, via duct 21, through inflow port 17.

Figures 2A, 2B:
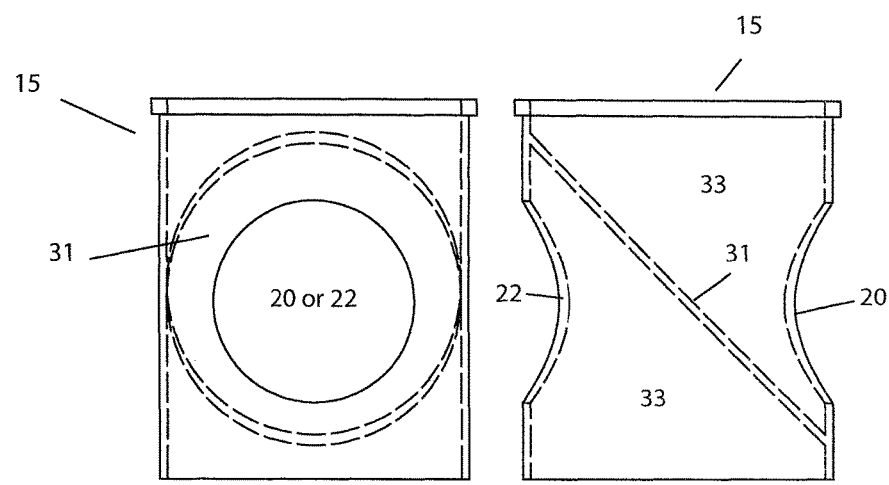
FIG. 2A is a section view of the inner drum only, taken in a direction transverse to the duct that is attached to and extends around the outer drum.
FIG. 2B is a section view of the inner drum only, taken in a direction longitudinal to the duct that is attached to and extends around the outer drum.

As shown in FIGS. 2A and 2B, inner drum 15 preferably has a single baffle 31 on an inner compartment 33 thereof, which is preferably extended at an angle, such as at 45 degrees (but not necessarily limited to 45 degrees). Baffle 31 preferably separates inner compartment 33 of drum assembly 7 into two smaller compartments—an upper compartment 35, shown in FIG. 3, or 38, shown in FIG. 6, and a lower compartment 37, shown in FIG. 3, or 36, shown in FIG. 6.

When inner drum 15 is in its vacuum position, as shown in FIG. 3, inner compartment 33 is divided into two vacuum compartments: 1) an upper vacuum compartment 35, which comprises inflow port 17 communicating with duct 21 and drum assembly 7, and upper port 9 communicating with drum assembly 7 and the atmosphere 11, which allows air to flow through inflow port 17 and into drum assembly 7 and up into the atmosphere 11 through upper port 9, and 2) a lower vacuum compartment 37, which comprises lower port 13 communicating with caisson 5 and drum assembly 7, and outflow port 19 communicating with drum assembly 7 and duct 21, which allows air to flow out of caisson 5 through lower port 13 and up into drum assembly 7 and out through outflow port 19 and into duct 21.

When inner drum 15 is in its pressure position, as shown in FIG. 6, inner compartment 33 is divided into two pressure compartments: 1) an upper pressure compartment 38, which comprises upper port 9 communicating with the atmosphere 11 and drum assembly 7, and outflow port 19 communicating with drum assembly 7 and duct 21, which allows air to flow through upper port 9 and into drum assembly 7 and into duct 21 through outflow port 19, and 2) a lower pressure compartment 36, which comprises inflow port 17 communicating with duct 21 and drum assembly 7, and lower port 13 communicating with drum assembly 7 and caisson 5, which allows air to flow out of duct 21 through inflow port 17 and into drum assembly 7 and out through lower port 13 and into caisson 5.

Accordingly, by rotating inner drum 15 and setting it to its proper position, inner compartment 33 can be separated by baffle 31 so that it creates a vacuum position where 1) inflow port 17 communicates with upper port 9, and 2) outflow port 19 communicates with lower port 13. Conversely, inner drum 15 can be rotated 180 degrees so that inner compartment 33 can be separated by baffle 31 to create a pressure position where 1) inflow port 17 communicates with lower port 13, and 2) outflow port 19 communicates with upper port 9. The rotation and positioning of inner drum 15 relative to outer drum 27, in this respect, determines the directional flow of air, including whether the air will flow into or out of caisson 5, i.e., whether the valve will be set to its vacuum or pressure positions.

The following describes these two different operating positions, as follows:

First, to drive air out of caisson 5, through upper port 9 and into the atmosphere 11, as shown in FIG. 3, inner drum 15 is preferably rotated so that side ports 20 and 22, on inner drum 15 are aligned with inflow and outflow ports 17 and 19, but with baffle 31 positioned as shown in FIG. 3, so that upper port 9 communicates with inflow port 17, and lower port 13 communicates with outflow port 19. Then, by operating blower or pump 3 within duct 21, the air will be drawn out of caisson 5, through lower port 13, and into lower vacuum compartment 37 of drum assembly 7, and because baffle 31 splits and redirects air within inner compartment 33 toward outflow port 19, the air will flow through outflow port 19, in the direction of arrow 10, and into duct 21, as driven by blower or pump 3. Then, blower or pump 3 will drive air around duct 21, and eventually back into drum assembly 7, i.e., into upper vacuum compartment 35, through inflow port 17. In such case, baffle 31 will redirect the air within upper vacuum compartment 35 up and into the atmosphere 11, through upper port 9, in the direction of arrow 12. Thus, by operating blower or pump 3 in this manner, the air will be driven within duct 21 in a single direction 8, as shown in FIG. 5, such that air will be drawn out of caisson 5 and into drum assembly 7, and then, around duct 21 and back into drum assembly 7, where it will then be redirected by baffle 31 up into the atmosphere 11, through upper port 9, wherein this will decrease air pressure within caisson 5.

Second, to drive air under pressure from the atmosphere 11 into caisson 5, as shown in FIG. 6, inner drum 15 is preferably rotated 180 degrees so that the two side ports, 22 and 20, on inner drum 15 are aligned with inflow and outflow ports 17 and 19 on outer drum 27, but this time, with baffle 31 angled in the opposite direction, as shown in FIG. 6, such that upper port 9 communicates with outflow port 19, and lower port 13 communicates with inflow port 17. That way, by operating blower or pump 3, the air will be driven through duct 21, in the direction shown by arrow 8, which will cause air from the atmosphere 11 to be drawn into drum assembly 7, through upper port 19, wherein because baffle 31 splits and redirects the air inside inner compartment 33 into upper pressure compartment 38, toward outflow port 19, the air will flow out through outflow port 19, and into duct 21, wherein blower or pump 3 will drive air around duct 21 in the direction 8, as shown in FIG. 8, and eventually back into drum assembly 7, through inflow port 17. In such case, baffle 31 will redirect air within lower pressure compartment 36, in direction 16, as shown in FIG. 6, wherein baffle 31 will redirect air within lower pressure compartment 36 down into caisson 5, through lower port 13. Thus, by operating blower or pump 3 in this manner, air within duct 21 will be driven in a single direction 8, and will be drawn from the atmosphere 11, down into drum assembly 7, and then around duct 21, and eventually back into drum assembly 7, where it will be redirected by baffle 31 and driven down into caisson 5, which will have the effect of increasing air pressure within caisson 5.

Accordingly, four-way rotary valve 1 can be operated with a single blower or pump 3, and used to 1) inject air into caisson 5, and 2) evacuate air out of caisson 5, simply by rotating inner drum 15 to its proper position, all the while driving the air in a single direction. With side ports 20 and 22 on inner drum 15 and inflow and outflow ports 17 and 19 on outer drum 27 aligned together, air can be injected into caisson 5, to increase air pressure therein, and with inner drum 15 rotated 180 degrees, air can be evacuated out of caisson 5, which creates negative air pressure therein, wherein the opposite effect can be created.

Four-way rotary valve 1 can also serve as a shut off valve, i.e., to terminate all air flow around duct 21, into and out of caisson 5, which can be done by rotating inner drum 15 ninety degrees, or in a manner that causes inflow and outflow ports 17 and 19 to be sealed by the solid cylindrical side wall 16 of inner drum 15. That way, the inflow and outflow ports 17 and 19 on outer drum 27 will not be aligned with an opening on inner drum 15, and thus, no air will be allowed to pass through drum assembly 7, thereby shutting down all flow.

Also, inner drum 15 can be rotated to virtually any position or degree to achieve the desired results, including varying its rotational position such that the size of the opening on inflow and outflow ports 17 and 19 is only a portion of the full opening—such as one-half, one-third, one-quarter, etc. —wherein the amount of air flowing through drum assembly 7 can be controlled and regulated by rotating inner drum 15.

The rotation of inner drum 15 is preferably controlled and driven by a servo motor 41 (partially shown) that drives a belt 43 wrapped around the top of inner drum 15 to precisely control its position, as shown in FIGS. 1, 5 and 8. This could also be gear-driven, such by using spur gears, or direct-driven, using a reduction gear on a common axis with inner drum 15. Any other suitable means for rotating inner drum 15 can be used.

The rotation of inner drum 15, including its speed and direction, is preferably controlled by programmable servo motor 41. For example, the operator can use the servo 41 to rotate and select the position of inner drum 15, which determines the size of the openings on inflow and outflow ports 17 and 19, and whether and how much air can flow through drum assembly 7, and in what direction, either into or out of caisson 5. By adjusting the position of inner drum 15, the rotary valve can adjust the size of the openings on the inflow and outflow ports 17 and 19, and therefore, the amount of air that flows into and out of caisson 5, as well as how much it is choked-off, so that the valve serves to provide both directional and throttling control.

The rotary valve can also be operated at various speeds, including at a fixed speed, such that inner drum 15 rotates at a constant speed and direction. This simplified control introduces equal time in both the pressure and vacuum realm creating a near sinusoid wave profile. This is particularly true with the four-way valve, where the vacuum cycle immediately goes into the pressure cycle and the pressure cycle immediately goes into the vacuum cycle, with no off time in between. In other words, a balanced amount of time, such as 50% attributed to pressure, and 50% attributed to vacuum, can normally be applied, thereby producing a substantially continuous sinusoid.

B. Three-Way Rotary Valve:

The three-way rotary valve 51 is designed to be used when there are separate pressure and vacuum sources, such as two blowers, rather than a single blower, although it can also be used with a single blower or pump, as will be explained.

The three-way rotary valve 51 can also be used when air storage plenums are utilized, although it can also be used when individual blowers or pumps are provided to create vacuum and pressure.

The three-way rotary valve 51 is preferably positioned on top of or adjacent a wave generator caisson and helps control the flow of air into and out of the caisson. The valve 51 has an adjustable feature that allows it to be moved between at least three different positions, as follows:

1) a first pressure position which allows a first blower to drive air from the atmosphere and into the associated caisson, thus increasing air pressure in the caisson;
2) a second vacuum position which allows a second blower to drive air out of the associated caisson and into the atmosphere, thus decreasing pressure in the caisson; and
3) a third position which prevents air from being introduced into or withdrawn from the caisson.

These three positions are controlled by a drum assembly 56, which has a rotating inner drum 60 coaxially aligned and oriented inside an outer drum 58. The three positions are determined by the rotational positioning of inner drum 60 inside outer drum 58, as will be discussed.

Figure 15:
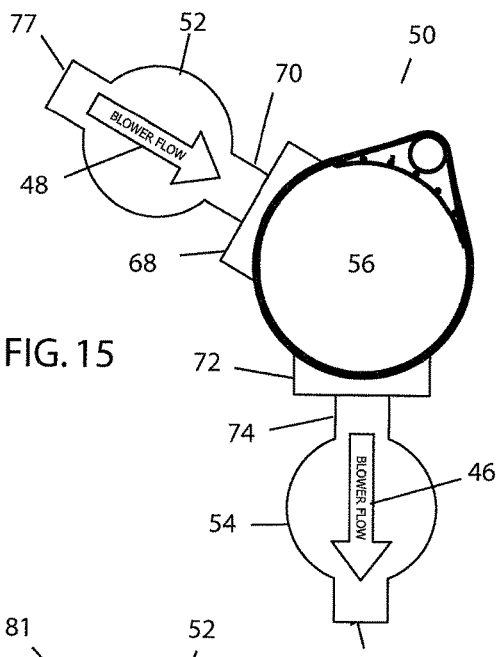
FIG. 15 is a top view of an embodiment of the three-way rotary valve showing a first blower open to atmosphere on its intake side connected to and communicating with the inflow port, and a second blower porting to atmosphere on its outlet side connected to and communicating with the outflow port.

An embodiment 50 that utilizes a separate pressure source, such as a first blower 52 located on one side of drum assembly 56, and a separate vacuum source, such as a second blower 54, located on the other side of drum assembly 56, is shown in FIG. 15 and will be discussed first.

Figure 9:
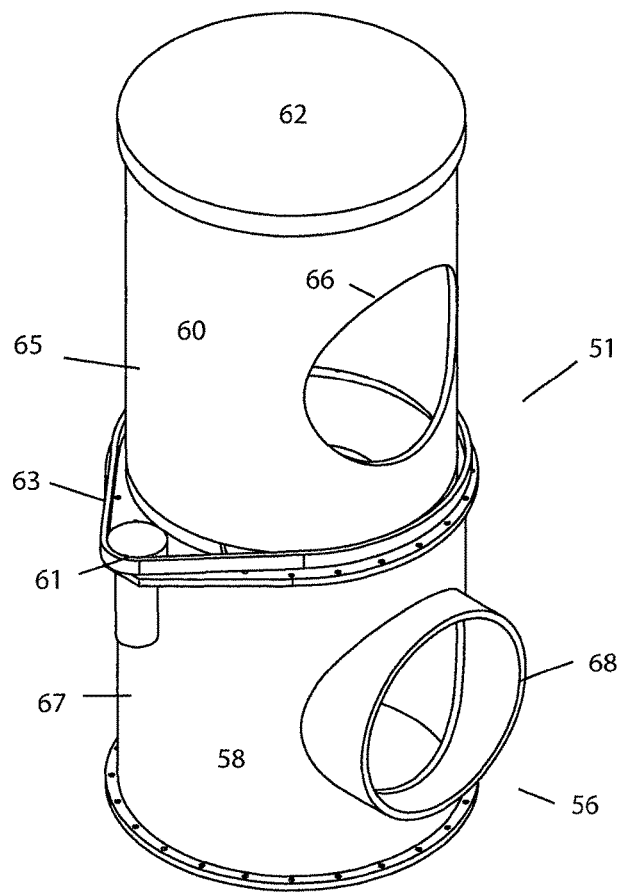
FIG. 9 is a perspective/exploded view of the three-way rotary valve showing the drum assembly, but with the inner drum separately shown elevated axially above the outer drum (the inner drum is normally positioned inside the outer drum, in its operational configuration, as shown in FIGS. 11 and 13)
Figure 11:
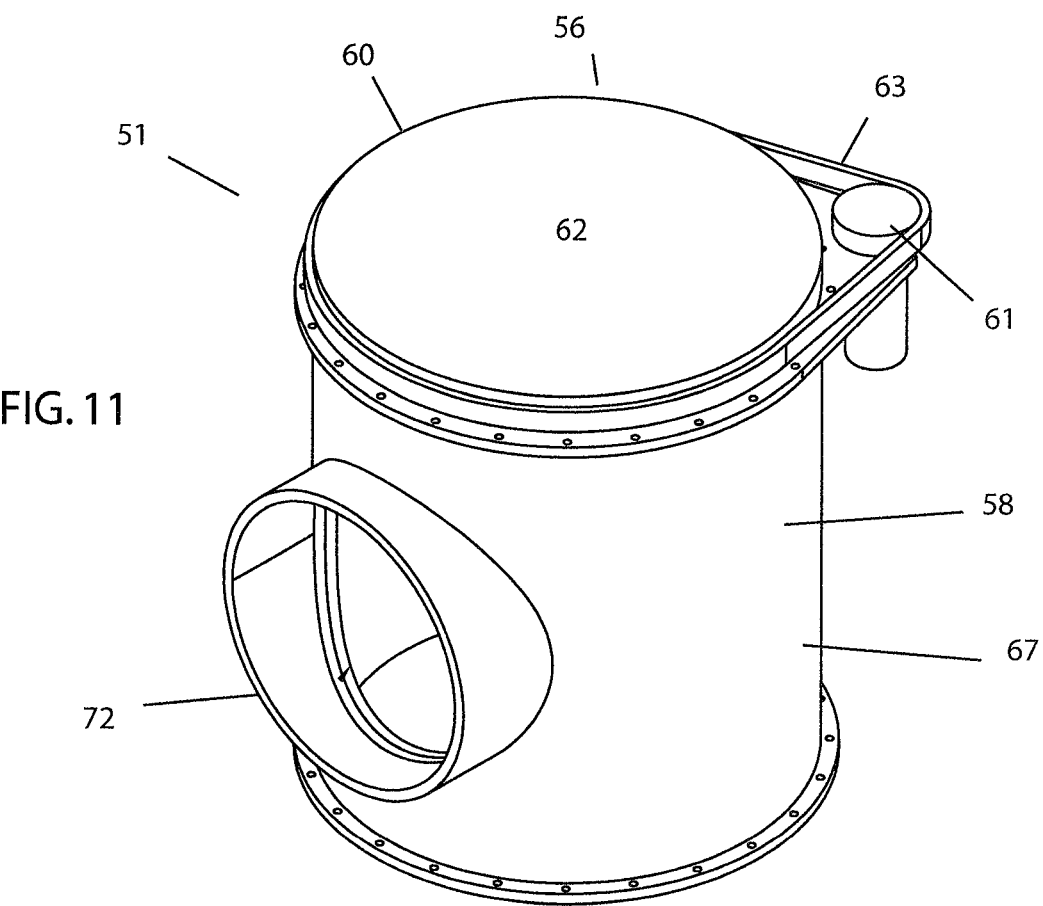
FIG. 11 is a perspective view of the drum assembly of the three-way rotary valve showing the outflow port on the side wall, with the inner drum positioned inside the outer drum.
Figure 13:
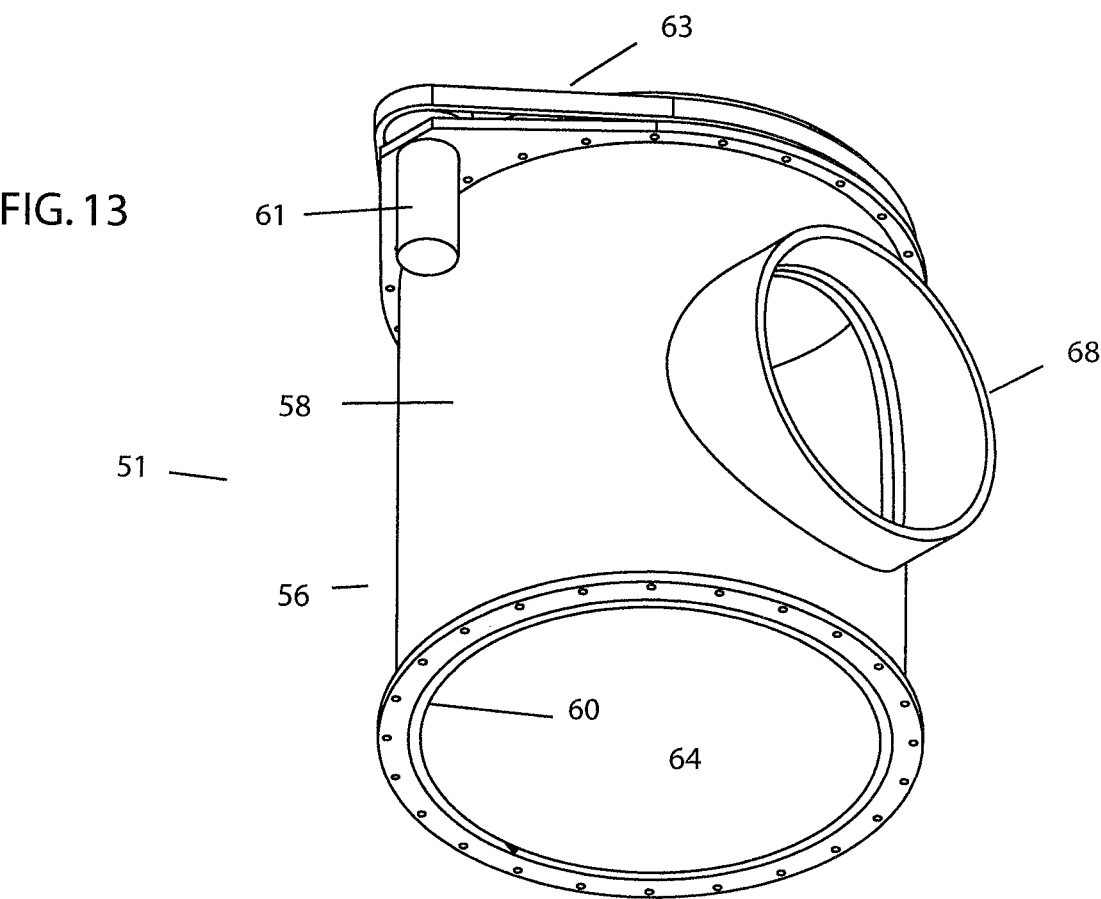
FIG. 13 is a lower perspective view of the drum assembly of the three-way rotary valve showing the inflow port on the side wall, with the inner drum positioned inside the outer drum.

FIG. 9 shows drum assembly 56 with inner drum 60 elevated coaxially above outer drum 58, but in actual operation, inner drum 60 is positioned coaxially inside outer drum 58, as shown in FIGS. 11 and 13.

Figure 10A:
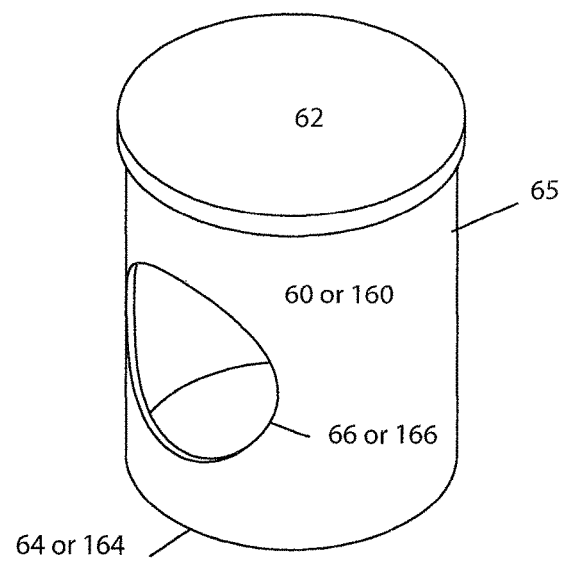
FIG. 10A is a perspective view of the inner drum only of the three-way rotary valve showing the single side port on the side wall.

As shown in FIG. 10A, inner drum 60 preferably has a closed top 62, and an open bottom with a lower port 64 communicating with a wave generator caisson (which is preferably connected to and positioned beneath the three-way rotary valve 51, although not necessarily so, wherein the caisson has an opening at the top that communicates with lower port 64 of drum assembly 56).

Inner drum 60 preferably has vertically extended cylindrical side wall 65, on which there is preferably one side port or opening 66, as shown in FIGS. 9, 10A, 10B and 10C. Outer drum 58 preferably has vertically extended cylindrical side wall 67, having a slightly greater diameter, wherein outer drum 58 has two side ports or openings thereon, including an "inflow port" 68, and an "outflow" port 72, preferably on opposing sides. Note that inflow port 68 is shown in FIG. 9 and outflow port 72 is shown in FIG. 11. Also note that outer drum 58 is preferably open at the top and bottom—at the top to allow inner drum 60 to be coaxially inserted therein, and along the bottom to allow communication with the top of the associated caisson below.

In this embodiment, 50, inflow port 68 is preferably connected to and/or communicates with first blower 52, via duct 70, and outflow port 72 is preferably connected to and/or communicates with second blower 54, via duct 74, as shown in FIG. 15. First blower 52 is preferably positioned and oriented so that it can draw air from the atmosphere, via open port 77, as shown in FIG. 15, in the direction of arrow 48, and with inner drum 60 in a first pressure position, with its side port 66 aligned with inflow port 68, first blower 52 can inject air into drum assembly 56, through duct 70, via inflow port 68, and via side port 66 on inner drum 60. Drum assembly 56 has a lower port 64 that communicates with the opening on the caisson, and thus, the air driven into drum assembly 56 is driven down into the associated caisson 5, via lower port 64, to create positive air pressure in the caisson and create the next wave.

This occurs because with inner drum 60 rotated to its first pressure position, side port 66 of inner drum 60 is aligned with inflow port 68 of outer drum 58, wherein cylindrical side wall 65 of inner drum 60 blocks the opening of outflow port 72. Thus, when air is driven by first blower 52 in the direction of drum assembly 56, it will be driven through inflow port 68, and into drum assembly 56, and then, down into the associated caisson 5, through lower port 64.

Likewise, in this embodiment, 50, second blower 54 is positioned and oriented so that it can draw air out of the associated caisson 5, via lower port 64, in the direction of arrow 46, as shown in FIG. 15, and with inner drum 60 in a second vacuum position, with its side port 66 aligned with outflow port 72, second blower 54 can draw air out of the associated caisson 5, and into drum assembly 56, via lower port 64. And because side port 66 on inner drum 60 will be aligned with outflow port 72, air will be driven by second blower 54 through drum assembly 56, and from there, it will flow through outflow port 72, and duct 74, and second blower 54, and out into the atmosphere through open port 79, to create negative air pressure in the caisson.

This occurs because with inner drum 60 rotated to its second vacuum position, side port 66 of inner drum 60 is aligned with outflow port 72, wherein cylindrical side wall 65 of inner drum 60 blocks the opening of inflow port 68. Thus, when air is driven by second blower 54, the air will flow out of the caisson and into drum assembly 56 through lower port 64, after which, it will be driven through outflow port 72, and into duct 74, and from there, it will be driven by second blower 54, and out into the atmosphere through open port 79.

Figure 12:
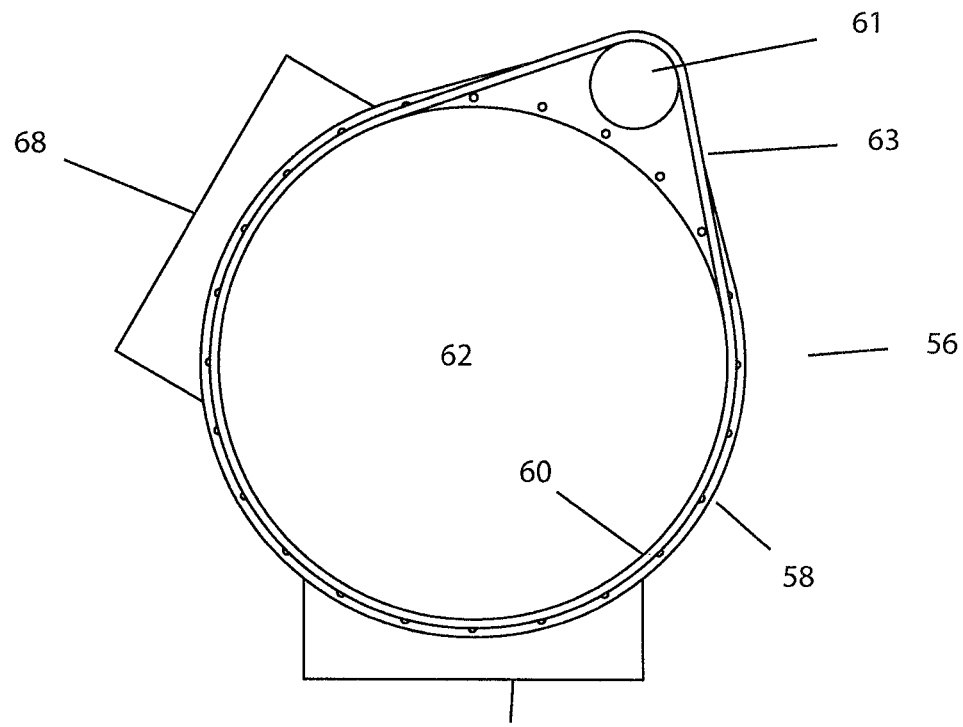
FIG. 12 is a top view of the drum assembly of the three-way rotary valve showing the inflow and outflow ports extended out from the side wall.
Figure 14:
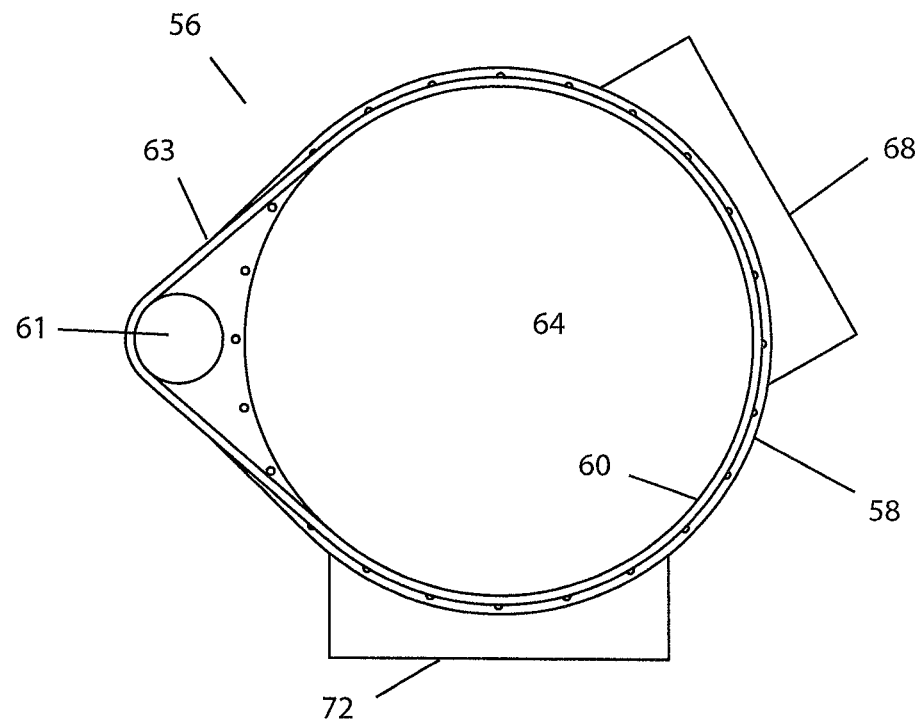
FIG. 14 is a bottom view of the drum assembly of the three-way rotary valve showing the inflow and outflow ports extended out from the side wall.

First inflow port 68 and second outflow port 72 on outer drum 58 preferably have the same size and shape, and are preferably positioned at the same height, as side port 66 on inner drum 60, so that when they are rotated and aligned with each other, air can pass through the aligned ports and into and out of drum assembly 56. On the other hand, inflow port 68 and outflow port 72 are preferably offset from each other by a predetermined angle/distance, such as 120 degrees, as shown in FIGS. 12 and 14, wherein the preferred range is from 45 to 180 degrees, depending on the size and location of inflow and outflow ports 68 and 72, and the orientation of the blowers, ducts, and ports, etc.

The three-way rotary valve 51 is preferably adjustable wherein by rotating inner drum 60 inside outer drum 58, it can be moved between at least three different positions, as follows:

First, to increase air pressure within the associated caisson, inner drum 60 is preferably rotated so that its side port 66 is aligned partially or fully with inflow port 68 on outer drum 58. That way, air driven by first blower 52 can pass through inflow port 68 and into drum assembly 56, wherein the positioning of inner drum 60 enables first blower 52 to drive air through drum assembly 56 and down into the associated caisson, through lower port 64, thereby creating positive air pressure in the caisson. Rotating inner drum 60 to its first pressure position enables side port 66 to be aligned with inflow port 68, thereby allowing air to pass through, while cylindrical side wall 65 of inner drum 60 will block outflow port 72 on outer drum 58.

Second, to evacuate air out of the associated caisson, and thus, decrease air pressure within the caisson, inner drum 60 can be rotated so that its side port 66 is aligned partially or fully with outflow port 72 on outer drum 58. That way, air driven by second blower 54 is withdrawn from the caisson and up into the drum assembly 56, through lower port 64, and out through drum assembly 56, through outflow port 72 and duct 74, and into second blower 54, wherein the air flows into the atmosphere through open port 79. Rotating inner drum 60 to its second vacuum position enables side port 66 to be aligned with outflow port 72, thereby allowing air to pass through, while cylindrical side wall 65 of inner drum 60 will block inflow port 68. With second blower 54 associated with outflow port 72, air can be drawn out of the associated caisson through lower port 64, and into drum assembly 56, and then, vented into the atmosphere, via open port 79, thus creating negative air pressure in the caisson.

Third, to serve as a shut-off valve, inner drum 60 can be rotated so that its side port 66 is aligned with solid cylindrical side wall 67 of outer drum 58, and thus, inflow and outflow ports 68 and 72 will both be blocked by the solid cylindrical side wall 65 of inner drum 60, in which case, air flow through drum assembly 56 and therefore into and out of the caisson will be prevented. By aligning side port 66 on inner drum 60 with solid cylindrical side wall 67 of outer drum 58, the flow of air can be stopped in both directions—into and out of drum assembly 56.

Figure 16:
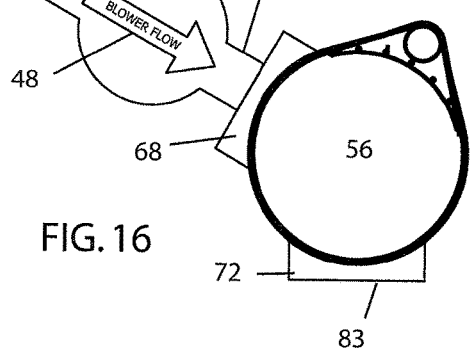
FIG. 16 is a top view of an embodiment of the three-way rotary valve showing a blower open to atmosphere on its intake side connected to and communicating with the inflow port, wherein the outflow port is open to atmosphere.
Figure 17:
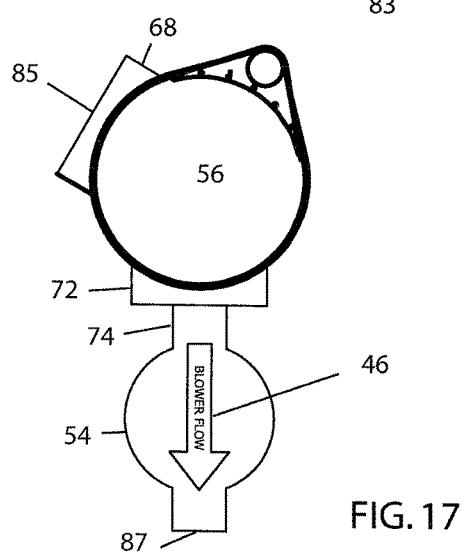
FIG. 17 is a top view of an embodiment of the three-way rotary valve showing a blower porting to atmosphere on its outlet side connected to and communicating with the outflow port, wherein the inflow port is open to atmosphere.

The three-way rotary valve 51 can also be used with only one blower or pump, i.e., only one vacuum source, or one pressure source, connected to one side port, either inflow port 68 or outflow port 72, as shown in FIGS. 16 and 17. In that scenario, the single pressure or vacuum source is connected to either the inflow port 68, as shown in FIG. 16, or outflow port 72, as shown in FIG. 17, depending on which direction the air is to be driven by the blower or pump.

If blower 52 is connected to inflow port 68, as shown in FIG. 16, air can be driven in the direction of arrow 48, into drum assembly 56, via duct 70 and inflow port 68, and thus, air will flow from the atmosphere via port 81, and through drum assembly 56, and down into the associated caisson, through lower port 64.

On the other hand, if blower 54 is connected to outflow port 72, as shown in FIG. 17, air can be driven in the direction of arrow 46, out of drum assembly 56, via outflow port 72, and duct 74, and by virtue of operating blower 54, the air will flow into the atmosphere through open port 87.

In either case, this version takes advantage of the pressure differential that can exist when the water level in the caisson is not in equilibrium with the water level in the wave pool. If the water level in the caisson is above equilibrium, the restoring force of gravity will cause water in the caisson to drop down and forward through the lower opening to create the next wave. Or, if the water level in the caisson is below equilibrium, the restoring force of gravity will cause the water from the wave pool to be drawn back into the caisson, wherein the water level in the caisson will rise back up, and thus refiling the caisson with water.

Accordingly, by rotating inner drum 60, this configuration of the three-way rotary valve 51 will enable water to be released from the caisson into the pool to create a wave, and it can also allow water to refill the caisson during the charging phase, by drawing water out of the pool, depending on the position of inner drum 60.

Using this configuration, the three-way rotary valve 51 can operate with only one blower or pump in at least the following three scenarios:

First, as shown in FIG. 16, to drive air into the caisson, and thus push water forward to create a wave, inner drum 60 can be rotated with its side port 66, as shown in FIGS. 9, 10A, 10B and 10C, aligned with inflow port 68, as shown in FIG. 13. Thus, with first blower 52 connected to inflow port 68 on drum assembly 56, and side port 66 on inner drum 60 rotated and aligned with inflow port 68, the associated blower or pump 52 can draw air from the atmosphere 81, and drive it through inflow port 68 and into drum assembly 56, in the direction of arrow 48, where the air is directed down through lower port 64, and into the associated caisson, which increases pressure in the caisson and drives water in the caisson down and out through the slot opening, resulting in wave propagation in the connected pool (not shown). The air driven by first blower 52 will pass through inflow port 68 and into drum assembly 56, and then, down into the associated caisson, thereby creating positive air pressure and driving water in the caisson down and forward to create the next wave. As will be explained, this process preferably causes the water level in the caisson to be driven down substantially below the static mean water level of the pool, i.e., below equilibrium.

Second, to draw water back into the caisson, i.e., during the refill stage, inner drum 60 is simply rotated so that its side port 66 is aligned with outflow port 72, which causes inflow port 68 to be blocked, and because outflow port 72 is vented to the atmosphere 83, air in the caisson simply passes from the caisson, through lower port 64 and into drum assembly 56, where it will be vented through outflow port 72 to the atmosphere 83, thus allowing the pressure differential, i.e., water seeking its own level, to cause water in the wave pool to be drawn back into the caisson, thus increasing the water level in the caisson. Even though no vacuum source is provided, and therefore, nothing is pulling on the water column to draw it into the caisson, by allowing air to escape through outflow port 72, and into atmosphere 83, the caisson water level will naturally rise due to the restoring force of gravity, until equilibrium is reached.

If the pressure differential is large enough, the force and momentum of the water refilling the caisson can result in the water level in the caisson rising above equilibrium, wherein, the end result will be that the water in the caisson will rise above the static mean water level in the pool, and at that point, the rotary valve can be used to shut off the flow of air, i.e., by rotating inner drum 60, so that its side port 66 is aligned with the solid cylindrical side wall 67 of outer drum 58, and not aligned with either opening on outer drum 58, and thus, this will fix the water level at its elevated position, after it reaches a point well above equilibrium. That way, the water level in the caisson can be high enough so that an additional pressure differential will be created, which can then facilitate the downward movement of the water column in the caisson and its release into the wave pool during the next wave cycle. That is, once the caisson has been refilled, it will be ready for the next phase, wherein the cycle can be repeated again with additional caissons.

Third, as mentioned, by rotating inner drum 60 so that its side port 66 is aligned with the solid cylindrical side wall 67 portion of outer drum 58, all air flow into and out of drum assembly 56 can be stopped. By aligning side port 66 on inner drum 60 with solid cylindrical side wall 67 of outer drum 58, i.e., so that it is not aligned with an opening on outer drum 58, flow can be stopped in both directions, into and out of the caisson.

In another embodiment, as shown in FIG. 17, with second blower 54 connected to outflow port 72 on drum assembly 56, and with side port 66 on inner drum 60 aligned with outflow port 72, second blower 54 can draw air out of the caisson, through lower port 64, and into drum assembly 56, where it can then be driven out by second blower 54, through outflow port 72, and duct 74, and vented into the atmosphere 87. This decreases pressure in the caisson and helps to draw water back into the caisson from the wave pool during the refill stage.

But since there is no blower or pump on inflow port 68, to drive air back into the caisson, and thus, create the next wave, this version takes advantage of the pressure differential that can be created as extra water is drawn back into the caisson during the refill stage, wherein water in the caisson is allowed to rise above equilibrium. Accordingly, this configuration can be used to create the next wave, by first drawing sufficient air out of the caisson, so that the water level in the caisson rises significantly above equilibrium, and then, allowing air to enter back into the caisson, thus, enabling the pressure differential of the water column in the caisson and the restoring force of gravity to cause the water level in the caisson to drop, wherein the next wave cycle can then help create the next wave.

By rotating inner drum 60 and aligning its side port 66 with inflow port 68, atmospheric air 85 will be allowed to pass into drum assembly 56, through inflow port 68, and down through lower port 64, and into the caisson, thereby enabling the pressure differential in the water column and the restoring force of gravity to cause the elevation of the water column to drop down, which has the effect of driving water down and forward through the caisson's lower opening to create the next wave.

Because a sufficient amount of water has been drawn back into the caisson during the refill stage (which causes the water level in the caisson to be significantly higher than the static mean water level in the pool), and by allowing air to pass into drum assembly 56, through inflow port 68, air will be drawn back into the caisson, wherein, due to the pressure differential within the water column, and as water seeks its own level, the water column in the caisson will drop, which will produce the effect of driving water down and forward through the lower opening to create the next wave.

Then, once the water has been released and drops below the static equilibrium of the wave pool, inner drum 60 can be rotated so that its side port 66 is aligned with the solid cylindrical side wall 67 portion of outer drum 58, in which case, air flow into and out of drum assembly 56 will cease, and therefore, air flow into and out of the caisson can be stopped in both directions, thereby enabling the water level in the caisson to be controlled and stabilized, which will be beneficial for purposes of creating the next wave during the next wave cycle, wherein the valve can be shut off while the wave cycles progress and transition.

Also, inner drum 60 can be rotated to virtually any position or degree to achieve the desired results, including varying its rotational position such that the size of the opening on inflow and outflow ports 68 and/or 72 is only a portion of the full opening-such as one-half, one-third, one-quarter, etc. —wherein the amount of air flowing through drum assembly 56 can be controlled and regulated by rotating inner drum 60.

The rotation of inner drum 60 is preferably controlled and driven by a servo motor 61 that drives a belt 63 wrapped around the top of inner drum 60 to precisely control its position. This could also be gear-driven, such by using spur gears, or direct-driven, using a reduction gear on a common axis with outer drum 58. Any other suitable means for rotating inner drum 60 can be used.

The rotation of inner drum 60, including its speed and direction, is preferably controlled by programmable servo motor 61. For example, the operator can use the servo 61 to rotate and select the position of inner drum 60, which determines the size of the openings on inflow and outflow ports 68 and 72, and whether and how much air can flow through drum assembly 56, and in what direction, either into or out of caisson 5. By adjusting the position of inner drum 60, the rotary valve can adjust the size of the openings on the inflow and outflow ports 68 and 72, and therefore, the amount of air that flows into and out of caisson 5, as well as how much it is choked-off, so that the valve serves to provide both directional and throttling control.

The rotary valve can also be operated at various speeds, including at a fixed speed, such that inner drum 60 rotates at a constant speed and direction. This simplified control introduces equal time in both the pressure and vacuum realm creating a near sinusoid wave profile, except that with the three-way valve, a continuous sinusoid wave is more difficult to create, insofar as each cycle includes a pause or off-time in between. For example, each wave cycle consists of a pressure period (such as 33% of the time), followed by a vacuum period (such as 33% of the time), followed by a pause or off time (such as 33% of the time), thereby making it more difficult to create a continuous sinusoid wave profile.

Figure 18:
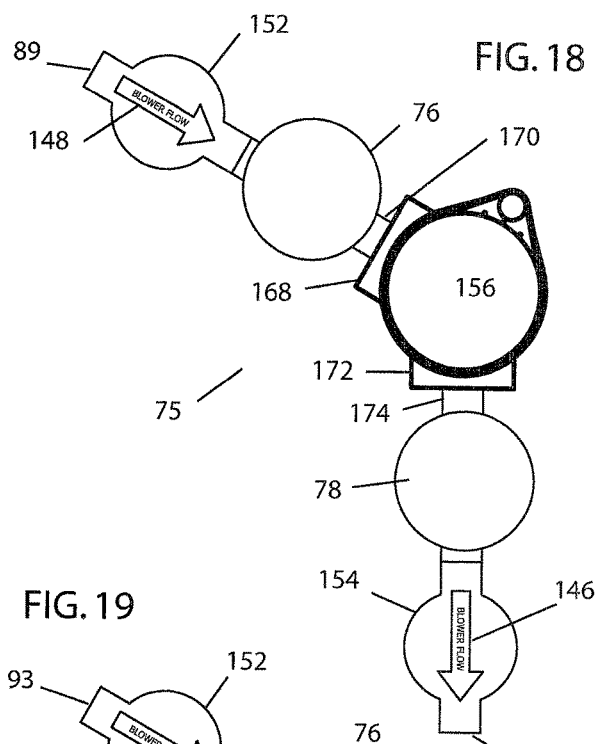
FIG. 18 is a top view of an embodiment of the three-way rotary valve showing a first blower open to atmosphere on its inlet side, connected to and communicating with a pressure plenum, which is connected to and communicates with the inflow port, and a second blower porting to atmosphere on its outlet side, connected to and communicating with a vacuum plenum, which is connected to and communicates with the outflow port.
Figure 19:
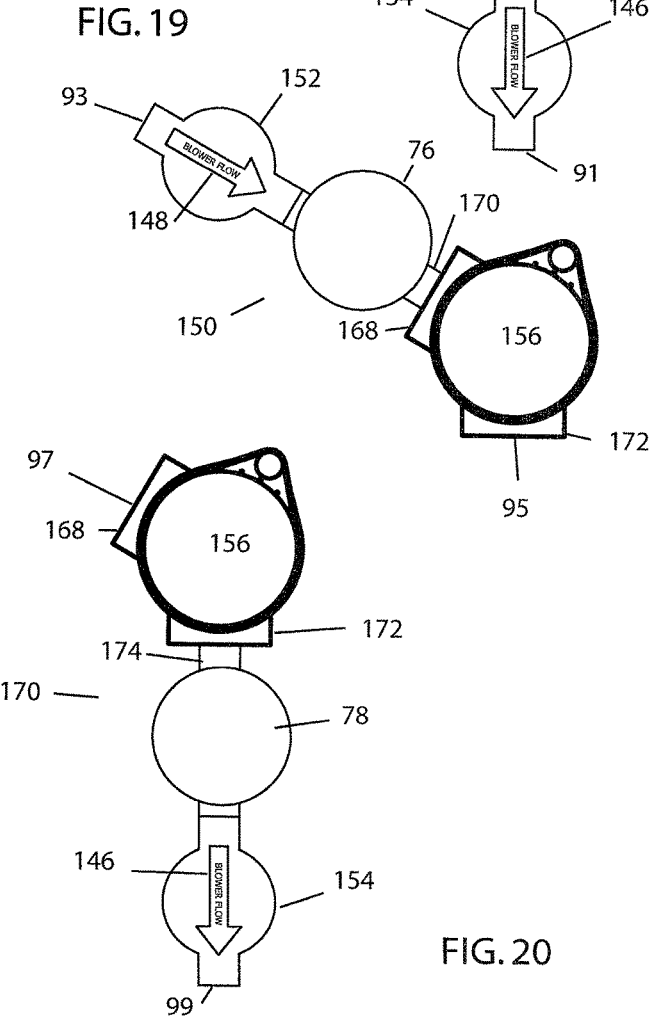
FIG. 19 is a top view of an embodiment of the three-way rotary valve showing a blower open to atmosphere on its intake side, connected to and communicating with a pressure plenum, which is connected to and communicates with the inflow port, wherein the outflow port is open to atmosphere.
Figure 20:
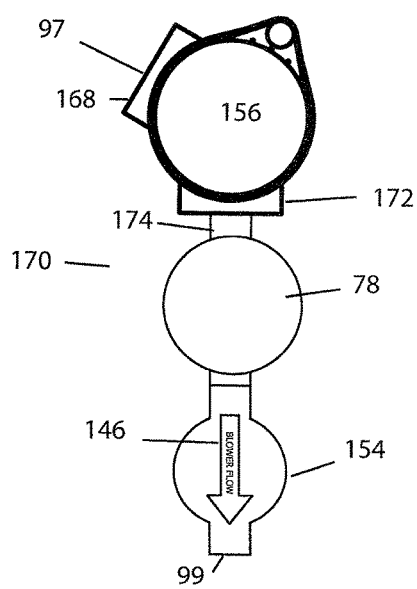
FIG. 20 is a top view of an embodiment of the three-way rotary valve showing a blower porting to atmosphere on its outlet side, connected to and communicating with a vacuum plenum, which is connected to and communicates with the outflow port, wherein the inflow port is open to atmosphere.

C. Valves Using Plenums:

In other embodiments, plenums, 76 and 78, as shown in FIGS. 18, 19 and 20, can be used to store energy before the air is introduced into the caisson or before the air is withdrawn from the caisson. In such case, in conjunction with the three-way rotary valves discussed above, each plenum, 76 and 78, can be located adjacent to the drum assembly 56, between it and the associated blower, 152 or 154, wherein plenums 76 and 78, can store compressed air energy, either positive or negative, produced by the associated blower so that it can be used later.

Note that multiple blowers or pumps can also be used in connection with each plenum. Nevertheless, for ease of understanding, the description herein will refer to only one blower or pump used with each plenum, although it should be understood that multiple blowers or pumps, such as a bank of blowers, can be used in connection with each plenum, whether the plenum stores positive or negative air pressure therein.

FIG. 18 shows a variation of the embodiment of FIG. 15 with two plenums associated therewith. This embodiment 75 has a similar first blower 152 and a similar second blower 154, but it also has two plenums, including a first plenum 76 between first blower 152 and drum assembly 156, which stores positive air pressure energy, and a second plenum 78 between second blower 154 and drum assembly 156, which stores negative air pressure energy. In either case, the energy from the first and second blowers, respectively 152 and 154, can be stored in the plenums, respectively 76 and 78, wherein first plenum 76 stores positive air pressure energy and second plenum 78 stores negative air pressure energy, thus helping to smooth out energy demand and enabling lower capacity energy sources to be used to provide the same amount of pressure.

Figure 10B:
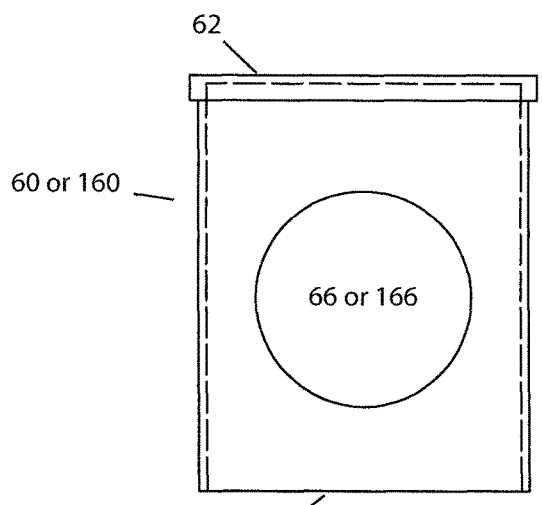
FIG. 10B is a side view of the inner drum only of the three-way rotary valve with a direct view of the single side port on the side wall.
Figure 10C:
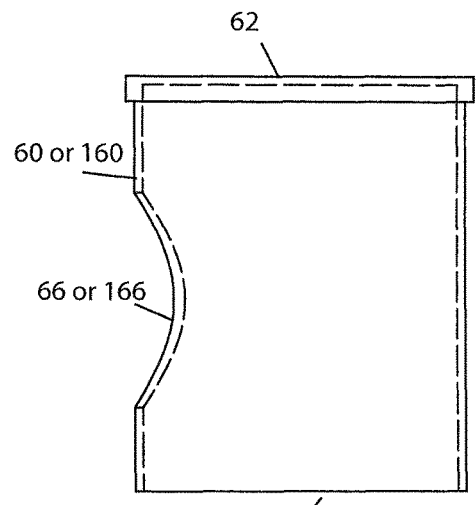
FIG. 10C is a side view of the inner drum only of the three-way rotary valve showing the single side port on the side wall, but turned at a ninety degree angle (compared to FIG. 10B)

For example, as shown in FIG. 18, air drawn from atmosphere 89 by first blower 152 in direction 148 enters into first plenum 76, where the air is compressed and stored as positive compressed air energy, and then, at the appropriate time, the air in first plenum 76 can be released via a valve 170, through inflow port 168, and into drum assembly 156, and redirected down through a lower port 164 (as shown in FIGS. 10A, 10B and 10C, which is similar to lower port 64), and into the associated caisson 5, thereby increasing air pressure in the caisson, and causing water to flow down and forward through a lower opening on the caisson to create waves in the pool.

Likewise, by rotating inner drum 160 so that its side port 166 (as shown in FIGS. 10A, 10B and 10C, which is similar to side port 66 on inner drum 60), is aligned with outflow port 172, second blower 154 can be operated to draw air out of second plenum 78, to create negative air pressure therein. Then, at the appropriate time, a valve 174 can be used to let air into second plenum 78, wherein the negative pressure contained therein draws air out of the associated caisson, through lower port 164, and into drum assembly 156, and then, out through outflow port 172, in direction 146, and into second plenum 78, and then, air in the second plenum 78 is eventually vented by second blower 154 into the atmosphere 91.

Essentially, what each plenum, 76 and 78, does is store energy (positive or negative) so that the same overall energy output can be achieved using a lower capacity source, wherein the source can be operated for a longer period of time to store the same amount of energy, sufficient to perform the needed task. For example, if the peak flow during a single wave cycle requires 10,000 CFM of air to create a wave, but only for an instant, a direct drive or plenum-less system, will need a blower having a capacity of 10,000 CFM flow to reach the maximum flow. But by using a plenum to store compressed air energy between the blower and valve, the needed 10,000 CFM of instantaneous flow can be achieved by utilizing the reserve of compressed air energy contained in the plenum, which is compressed over a greater length of time, wherein a lower capacity blower or pump can be used and operated (for a longer period of time) to store the needed energy and achieve substantially the same results.

This serves two advantages. First, this results in smoothing out the energy demand. For example, if the peak flow demand for an instant is 10,000 CFM, a blower or pump having a lower capacity, such as 500 CFM peak flow with an operating pressure equal to that of the larger blower, may be used and operated for 20 seconds to reach the maximum air pressure in the plenum to meet that demand. This will use less peak energy than a 10,000 CFM rated blower operating between 0 and 10,000 CFM at various times during the cycle.

Second, by storing the same amount of energy over a longer period of time, a smaller capacity blower or pump can be used, which will make the system more cost effective. In the same example, a blower having an average capacity of 500 CFM may cost considerably less than one having a capacity of twice that amount, while at the same time, by using the plenum to store the needed energy over a longer period of time, it will be able to produce substantially the same results as a 10,000 CFM rated blower. Because a typical wave cycle, i.e., the time it takes for a series of wave generators to be actuated sequentially before cycling and returning back to the original wave generator, could be 60 seconds or more, it can be seen that a 500 CFM blower can be operated for a sufficient length of time, i.e., up to 60 seconds, to store the needed reserve capacity to supply 10,000 CFM of instantaneous flow for the next wave cycle. After one wave has been produced (and in fact while that wave is firing) the associated blower can charge the plenum for the next wave, which could occur 60 seconds later.

FIG. 19 shows a variation of the embodiment of FIG. 16 with a plenum associated therewith. This embodiment 150 has a similar first blower 152 with a plenum 76 associated therewith, wherein plenum 76 is provided between first blower 152 and drum assembly 156, to store positive air pressure energy, wherein no second blower or plenum is provided and therefore no second plenum is necessary. In such case, the energy provided by first blower 152 is preferably stored in first plenum 76, in the form of positive compressed air energy, thus helping to smooth out the energy demand and enabling lower capacity blowers to be used to provide the same amount of air pressure.

For example, as shown in FIG. 19, air drawn from atmosphere 93 by first blower 152 in direction 148 enters into first plenum 76, where the air is compressed and stored as positive compressed air energy, and then, at the appropriate time, the air in first plenum 76 can be released by a valve 170, and into drum assembly 156 through inflow port 168, and redirected down into the caisson through lower port 164, thereby increasing air pressure therein, and causing the water level in the caisson to drop and force water down and forward into the pool to create a wave.

On the other hand, by rotating inner drum 160 so that its side port 166 is aligned with outflow port 172, outflow port 172 can be vented into the atmosphere 95, thus using the pressure differential within the caisson (created when the water level in the caisson drops below the wave pool's static equilibrium) to cause the water in the pool to be drawn back into the caisson, thus increasing the water level in the caisson. Even though no vacuum source or blower is used in connection with outflow port 172, and therefore, nothing is pulling on the water column to draw it into the caisson, by allowing air to escape through outflow port 172, and into the atmosphere 95, the water level in the caisson will naturally rise due to the restoring force of gravity—as water seeks its own level—until the pressure differential is offset and equilibrium is reached.

Or, when the water level in the caisson rises above the static equilibrium amount, the valve can be shut, by rotating the inner drum 60 so that both the inflow and outflow ports are blocked by the solid cylindrical side wall 65 of the inner drum, wherein all flow into and out of the drum assembly 56, and therefore, the caisson 5, can be prevented, thus preserving the pressure differential between the caisson and pool, by maintaining the water level in the caisson above the static equilibrium water level in the wave pool. That way, the caisson will be ready for the next wave cycle to generate another wave with more water, i.e., with the water level in the caisson above the equilibrium water level in the wave pool.

FIG. 20 shows a variation of the embodiment of FIG. 17 with a plenum associated therewith. This embodiment 170 has a similar blower 154, with a plenum 78 associated therewith, wherein plenum 78 is provided between blower 154 and drum assembly 156, to store negative are pressure energy therein. In such case, blower 154 draws air out of plenum 78 in the form of negative pressure energy, wherein this energy is stored in plenum 78. For example, as shown in FIG. 20, air drawn from plenum 78 by blower 154 in direction 146 causes negative air pressure to form within plenum 78, and then, at the appropriate time, plenum 78 can be opened, such as with a valve 174, which causes air to be drawn into drum assembly 156, out of the caisson, through lower port 164, and then, through outflow port 172, and into plenum 78, where eventually it can be released by blower 154, to atmosphere 99. This can cause the water level in the caisson to rise, such as above the static equilibrium level in the wave pool.

Since there is no blower on inflow port 168, which is open to atmosphere, to cause air to flow back into the caisson, and thus, allow the water column in the caisson to drop down to create the next wave, this version takes advantage of the pressure differential created as water is drawn into the caisson during the refill stage, and the water level in the caisson rises above the wave pool's static equilibrium.

Accordingly, to create the next wave, a sufficient amount of air is drawn out of the caisson, so that the water level in the caisson rises significantly above the static equilibrium water level in the wave pool. Then, by rotating the inner drum 160 so that its side port 166 is aligned with inflow port 168, air will be allowed to enter from the atmosphere back into the caisson, through inflow port 168, wherein, by virtue of the pressure differential created by the water column above equilibrium, and the restoring force of gravity, the water level in the caisson will suddenly drop, wherein the water in the caisson will flow down and forward into the wave pool to create the next wave.

Thus, by rotating inner drum 160 and aligning its side port 166 with inflow port 168, atmospheric air 97 will be allowed to pass into drum assembly 156, through inflow port 168, and down through lower port 164, and into the caisson, thereby enabling the pressure differential in the water column and the restoring force of gravity to cause the water column in the caisson to drop, which has the effect of driving water down and forward through the lower opening to create the next wave.

Inner drums 60 and 160 of the three-way rotary valve can be rotated in the same manner as inner drum 15 of the four-way rotary valve. For example, inner drums 60 and 160 can be rotated using a servo motor 61 that drives a belt 63 wrapped around the top of the drum assembly 56 to precisely control their positions. This could also be gear driven using spur gears, or direct driven using a reduction gear on a common axis with the inner drum.

Likewise, the inner drum's rotational speed and direction can be controlled by a programmable servo. The operator can choose the direction of air flow and how much it is choked off, so the valve can serve both directional and throttling control. The valve could also be controlled with a fixed speed motor with a mechanical linkage that would move the valve through a pressure cycle and then reverse the direction and bring it through a vacuum cycle to create a sinusoidal or other variant of a wave.

The valves and related components can be constructed using conventional materials, including those that are strong and corrosion or rust-resistant, such as stainless steel, aluminum, plastic, carbon fiber, etc. The components can be secured together using conventional fasteners, such as welding, nuts and bolts, screws, etc.

What is claimed is:

1. A valve system for controlling the movement of a fluid between a first area and a second area, comprising:
    a drum assembly having an inner drum coaxially aligned with an outer drum, wherein said inner drum is adapted to rotate inside said outer drum;
    at least one side opening on said inner drum and at least one side opening on said outer drum, wherein said at least one side opening on said inner drum is adapted to be aligned with said at least one side opening on said outer drum, wherein the alignment of said side openings allows the fluid to flow into and/or out of said drum assembly;
    wherein by rotating said inner drum relative to said outer drum, said drum assembly can be operated in at least two positions, comprising a first position that causes the fluid to be drawn out of said first area and into said second area, and a second position that causes the fluid to be drawn out of said second area and into said first area;
wherein a baffle is extended within said drum assembly, and a duct is connected to and associated with said drum assembly;
wherein a blower or pump is provided to cause the fluid to flow in a single direction around said duct, and into and/or out of said drum assembly;
wherein with said drum assembly in said first position, said baffle causes the fluid to flow out of said first area and into said drum assembly and around said duct and back into said drum assembly and into said second area; and
wherein with said drum assembly in said second position, said baffle causes the fluid to flow out of said second area and into said drum assembly and around said duct and back into said drum assembly and into said first area.

2. The valve system of claim 1, wherein said inner drum comprises a first cylindrical side wall, and said outer drum comprises a second cylindrical side wall, wherein at least two side openings are provided on said first cylindrical side wall, and at least two side openings are provided on said second cylindrical side wall, wherein said side openings on said inner and outer drums are substantially similar in size and shape, and located such that they can be aligned together to enable the fluid to flow into and out of said drum assembly through said side openings.

3. The valve system of claim 2, wherein said blower or pump communicates with said duct such that the fluid flows continuously in a single direction around said duct and wherein said blower or pump drives the fluid into and out of said drum assembly as the fluid travels around said duct.

4. The valve system of claim 3, wherein said valve system is adapted to be used in connection with a wave pool, the fluid is air, and said first area comprises a wave generator caisson, and said second area comprises the atmosphere, wherein said drum assembly and said duct are adapted to allow the air to flow into and out of said drum assembly through said duct, wherein with said drum assembly in said first position, said blower or pump draws air out of said caisson and into the atmosphere, and with said drum assembly in said second position, said blower or pump draws air from the atmosphere and into said caisson.

5. The valve system of claim 4, wherein said duct is adapted to enable the air to circulate into and out of said drum assembly, and said baffle divides said drum assembly into upper and lower compartments, wherein said at least two side openings on said outer drum comprise an inflow port on one side and an outflow port on another side, wherein by rotating said inner drum relative to said outer drum, said drum assembly can be operated in at least three positions, comprising:
said first position with said baffle oriented such that said upper compartment comprises said inflow port communicating with the atmosphere, and said lower compartment comprises said caisson communicating with said outflow port, wherein by operating said blower or pump, air flows out of said caisson and around said duct and back into said drum assembly through said inflow port, and then, out of said drum assembly and into the atmosphere;
said second position with said baffle oriented such that said upper compartment comprises the atmosphere communicating with said outflow port, and said lower compartment comprises said inflow port communicating with said caisson, wherein by operating said blower or pump, air flows from the atmosphere and into said drum assembly and around said duct and back into said drum assembly through said inflow port, and then, out of said drum assembly and into said caisson; and
a third shut-off position, wherein said side openings are closed, thus preventing air from flowing into and out of said drum assembly.

6. The valve system of claim 2, wherein by rotating said inner drum relative to said outer drum, the alignment of said at least two side openings on said inner drum with said at least two side openings on said outer drum can be adjusted and varied, which causes the size of the associated openings on said drum assembly to be adjusted and varied, wherein the rate at which the fluid can flow into and out of said drum assembly can be adjusted and varied, depending on the setting of the valve system.

7. The valve system of claim 1, wherein the rotation of said inner drum relative to said outer drum is controlled by a programmable servo motor so that said drum assembly can be switched between said first and second positions, and vice versa, in a cyclical manner, and the flow of the fluid within said drum assembly relative to said first and second areas can be reversed, while at the same time, said blower or pump can continue to drive the fluid in said single direction around said duct.

8. A valve assembly for controlling the movement of a fluid between a caisson and the atmosphere, comprising:
a drum assembly having an upper port communicating with the atmosphere, and a lower port communicating with said caisson, wherein said drum assembly comprises an inner drum adapted to rotate inside an outer drum;
two side ports located on said inner drum, and two side ports located on said outer drum, wherein said two side ports on said outer drum comprise an inflow port and an outflow port, and said two side ports on said inner drum are adapted to be aligned with said inflow port and said outflow port on said outer drum, to allow the fluid to flow into and out of said drum assembly;
a baffle extended within said drum assembly, wherein said baffle divides said drum assembly into upper and lower compartments;
a duct connected to said drum assembly and extended around in a loop, wherein a blower or pump is provided in association with said duct to cause the fluid to flow in a single direction around said duct, and said duct is adapted to enable the fluid to flow into and out of said drum assembly through said duct;
wherein by rotating said inner drum relative to said outer drum, the drum assembly can be operated in at least three different positions, comprising:
a first position with said baffle oriented such that in said upper compartment said inflow port communicates with said upper port, and in said lower compartment said lower port communicates with said outflow port;
a second position with said baffle oriented such that in said upper compartment said upper port communicates with said outflow port, and in said lower compartment said inflow port communicates with said lower port; and
a third shut-off position wherein said inflow and outflow ports are closed, thus preventing the fluid from flowing into and out of said drum assembly;
wherein said valve is adapted to be used in connection with a wave pool and the fluid is air, wherein by operating said blower or pump with said valve in said first position, said baffle causes the air to flow out of said caisson and into said drum assembly, and then, out of said drum assembly and around said duct and back into said drum assembly, and then, out of said drum assembly and into the atmosphere, wherein the pressure in said caisson can be decreased, thereby causing water in said wave pool to be drawn into said caisson; and by operating said blower or pump with said valve in said second position, said baffle causes the air to flow from the atmosphere and into said drum assembly, and then, out of said drum assembly and around said duct and back into said drum assembly, and then, out of said drum assembly and into said caisson, wherein the pressure in said caisson can be increased, thereby causing water in said caisson to flow down and forward into said wave pool to create a wave.

9. The valve assembly of claim 8, wherein said inner and outer drums are coaxially aligned and adapted to rotate relative to each other, and wherein said inner drum comprises a first cylindrical side wall, and said outer drum comprises a second cylindrical side wall, wherein said two side ports on said inner drum are sized, shaped and located such that they can be aligned together with said inflow and outflow ports on said outer drum, wherein the alignment enables the air to flow into and out of said drum assembly through said inflow and outflow ports.

10. The valve assembly of claim 8, wherein said baffle is extended at an angle relative to said drum assembly, such that, depending on the rotational position of said inner drum, said baffle causes said drum assembly to be in said first, second or third positions.

11. The valve assembly of claim 8, wherein the rotation of said inner drum relative to said outer drum is controlled by a programmable servo motor so that said drum assembly can be switched between said first and second positions, and vice versa, and the flow of air through said drum assembly relative to said caisson and the atmosphere can be reversed, while at the same time, said blower or pump can continue to cause the air to flow in said single direction around said duct.

12. The valve assembly of claim 8, wherein by rotating said inner drum relative to said outer drum, the alignment of said two side ports on said inner drum with said inflow and outflow ports on said outer drum can be adjusted and varied, which causes the size of the openings on said inflow and outflow ports on said drum assembly to be adjusted and varied, wherein the rate at which the air can flow into and out of said drum assembly can be adjusted and varied, such that the pressure inside said caisson can be adjusted and varied, depending on the setting of the valve.

13. A valve assembly for controlling the movement of a fluid between a first area and a second area, comprising:
   a drum assembly having an inner drum coaxially aligned with an outer drum, wherein said inner drum is adapted to rotate inside said outer drum;
   at least two side openings on said inner drum and at least two side openings on said outer drum, wherein said at least two side openings on said inner drum are adapted to be aligned with said at least two side openings on said outer drum, wherein the alignment of said side openings allows the fluid to flow into and out of said drum assembly;
   a baffle extended in said drum assembly and a duct communicating with said drum assembly, wherein a blower or pump communicates with said duct to cause the fluid to flow in a single direction around said duct;
   wherein said drum assembly can be operated in at least two positions, comprising a first position wherein said baffle causes the fluid to flow out of said first area and into said second area, and a second position wherein said baffle causes the fluid to flow out of said second area and into said first area; and
   wherein the rotation of said inner drum relative to said outer drum can be controlled by a programmable servo motor, so that said drum assembly can be switched between said first and second positions, and vice versa, and wherein the flow of the fluid within said drum assembly relative to said first and second areas can be reversed, while at the same time, said blower or pump can continue to cause the fluid to flow in said single direction around said duct.

14. The valve assembly of claim 13, wherein said inner drum comprises a first cylindrical side wall, and said outer drum comprises a second cylindrical side wall, wherein said at least two side openings on said inner drum are provided on said first cylindrical side wall, and said at least two side openings on said outer drum are provided on said second cylindrical side wall, wherein said side openings on said inner and outer drums are substantially similar in size and shape, and located such that they can be aligned together to enable the fluid to flow into and out of said drum assembly.

15. The valve assembly of claim 13, wherein said valve is adapted to be used in connection with a wave pool, the fluid is air, and said first area comprises a wave generator caisson, and said second area comprises the atmosphere, wherein:
   a) with said drum assembly in said first position, said blower or pump causes the air to flow out of said caisson and into said drum assembly and around said duct and back into said drum assembly and into the atmosphere, wherein the pressure inside said caisson can be decreased, and the water in said wave pool can be drawn into said caisson; and
   b) with said drum assembly in said second position, said blower or pump causes the air to flow out of the atmosphere and into said drum assembly and around said duct and back into said drum assembly and into said caisson, wherein the pressure inside said caisson can be increased, and the water in said caisson can be driven into said wave pool to create a wave.

16. The valve assembly of claim 15, wherein said drum assembly can be operated in a third shut-off position, wherein said side openings on said drum assembly are closed, thus preventing air from flowing into and out of said drum assembly.

17. The valve assembly of claim 15, wherein said baffle divides said drum assembly into upper and lower compartments, and said at least two side openings on said outer drum comprise an inflow port on one side of said drum assembly and an outflow port on another side of said drum assembly;
   wherein with said drum assembly in said first position, said baffle is oriented such that in said upper compartment, said inflow port communicates with the atmosphere, and in said lower compartment, said caisson communicates with said outflow port; and
   wherein with said drum assembly in said second position, said baffle is oriented such that in said upper compartment, said outflow port communicates with the atmosphere, and in said lower compartment, said inflow port communicates with said caisson.

18. The valve assembly of claim 17, wherein by rotating said inner drum relative to said outer drum, the alignment of said at least two side openings on said inner drum with said at least two side openings on said outer drum can be adjusted and varied, which causes the size of said inflow and outflow ports on said drum assembly to be adjusted and varied, wherein the rate at which the fluid can flow into and out of said drum assembly can be adjusted and varied, depending on the setting of the valve.

19. The valve assembly of claim 15, wherein said programmable servo motor can be operated in a cyclical manner to enable the water that is drawn into said caisson and driven into the wave pool to be acted upon in cycles to create periodic waves in the wave pool.

* * * * *